US012221814B2

(12) United States Patent
Su et al.

(10) Patent No.: US 12,221,814 B2
(45) Date of Patent: Feb. 11, 2025

(54) LOCK FOR SECURING A PORTABLE DEVICE

(71) Applicant: INGAMAR CO., LTD., Changhua County (TW)

(72) Inventors: Ming-Lung Su, Changhua County (TW); Huan-Yi Lin, Huntington Beach, CA (US)

(73) Assignee: INGAMAR CO., LTD., Changhua County (TW)

( * ) Notice: Subject to any disclaimer, the term of this patent is extended or adjusted under 35 U.S.C. 154(b) by 278 days.

(21) Appl. No.: 17/543,700

(22) Filed: Dec. 6, 2021

(65) Prior Publication Data

US 2023/0175292 A1 Jun. 8, 2023

(51) Int. Cl.
*E05B 73/00* (2006.01)

(52) U.S. Cl.
CPC ...... *E05B 73/0082* (2013.01); *E05B 73/0005* (2013.01)

(58) Field of Classification Search
CPC ..... E05B 73/00; E05B 73/0005; E05B 73/008
USPC ................................................ 70/14, 57, 58
See application file for complete search history.

(56) References Cited

U.S. PATENT DOCUMENTS 6,000,251 A * 12/1999 Murray, Jr. ......... E05B 73/0082 70/57
6,619,080 B1 * 9/2003 Yu ...................... E05B 73/0005 70/58
8,418,514 B1 4/2013 Su
8,505,344 B2 8/2013 Su
9,032,766 B2 5/2015 Su
9,137,911 B2 * 9/2015 Avganim ............. H05K 5/0208
9,549,476 B2 1/2017 Avganim
9,624,697 B1 4/2017 Uwe
9,644,402 B1 5/2017 Su
9,698,531 B2 7/2017 Su
9,784,019 B2 * 10/2017 Avganim ............ E05B 73/0082
10,808,431 B2 10/2020 Su
10,907,378 B2 * 2/2021 Su ....................... E05B 73/0005
10,944,213 B2 3/2021 Su (Continued)

FOREIGN PATENT DOCUMENTS

CN 101294464 A 10/2008
CN 202108344 U 1/2011

(Continued)

*Primary Examiner* — Suzanne L Barrett
(74) *Attorney, Agent, or Firm* — Huan-Yi Lin

(57) ABSTRACT

A lock for securing a portable device is disclosed. The lock can be inserted into a cavity. The cavity has a first sidewall and a second sidewall both of which extend away from an opening into the cavity with a gradually increasing distance between the two sidewalls for a section of the two sidewalls. The lock for securing a portable device comprises a lock body; a first engaging member projecting from the lock body and having an outside part outside the lock body, a cross-sectional area of the outside part of the first engaging member being substantially the same or become larger from a front end towards a rear end of the outside part of the first engaging member; and a second engaging member, connected to the lock body and configured to move along a side of or across the first engaging member to insert into the cavity for a locking status and to withdraw from the cavity for an unlocking status.

27 Claims, 25 Drawing Sheets

(56) References Cited

U.S. PATENT DOCUMENTS

| | | | | |
|---|---|---|---|---|
| 11,187,015 | B2 * | 11/2021 | Avganim | E05B 37/025 |
| 11,560,737 | B2 * | 1/2023 | Avganim | G06F 1/1679 |
| 2011/0122551 | A1 | 5/2011 | Hung et al. | |
| 2012/0227448 | A1 | 9/2012 | Su | |
| 2014/0130554 | A1 | 5/2014 | Su | |
| 2016/0081212 | A1 * | 3/2016 | Avganim | E05B 39/00 70/57.1 |
| 2017/0110831 | A1 | 4/2017 | Su | |
| 2017/0117667 | A1 | 4/2017 | Su | |
| 2018/0363334 | A1 * | 12/2018 | Wu | E05B 73/0005 |
| 2019/0112840 | A1 * | 4/2019 | Wu | E05B 73/0005 |
| 2019/0226243 | A1 * | 7/2019 | Lee | E05B 73/0082 |
| 2020/0173202 | A1 * | 6/2020 | Avganim | E05B 37/02 |
| 2020/0181950 | A1 | 6/2020 | Su | |
| 2020/0181951 | A1 | 6/2020 | Su | |
| 2020/0224451 | A1 | 7/2020 | Su | |

FOREIGN PATENT DOCUMENTS

| | | | |
|---|---|---|---|
| CN | 201857829 | U | 6/2011 |
| CN | 202548695 | U | 11/2012 |
| CN | 202593703 | U | 12/2012 |
| CN | 202756871 | U | 2/2013 |
| CN | 202884397 | U | 4/2013 |
| CN | 203268219 | U | 11/2013 |
| CN | 205840562 | U | 12/2016 |
| CN | 205840563 | U | 12/2016 |
| CN | 206039539 | U | 3/2017 |
| CN | 211549225 | U | 9/2020 |
| DE | 202008013792 | U1 | 3/2009 |
| DE | 202011000587 | U1 | 10/2011 |
| DE | 202012104588 | U1 | 1/2013 |
| DE | 202016104366 | U1 | 9/2016 |
| DE | 202020103859 | U1 | 7/2020 |
| FR | 3056791 | A3 | 3/2018 |
| GB | 2553113 | A | 2/2018 |
| JP | 3166771 | U | 3/2011 |
| JP | 3180374 | U | 12/2012 |
| JP | 3181210 | U | 1/2013 |
| JP | 3198592 | U | 7/2015 |
| JP | 3220111 | U | 2/2019 |
| JP | 3220916 | U | 4/2019 |
| JP | 3226506 | U | 7/2020 |
| JP | 3227280 | U | 8/2020 |
| TW | M350584 | U | 2/2009 |
| TW | M365079 | U | 9/2009 |
| TW | M366482 | U | 10/2009 |
| TW | I326323 | B | 6/2010 |
| TW | M414467 | U | 10/2011 |
| TW | M425912 | U | 4/2012 |
| TW | M429295 | U | 5/2012 |
| TW | M431846 | U | 6/2012 |
| TW | M440623 | U | 11/2012 |
| TW | M442296 | U | 12/2012 |
| TW | M444695 | U | 1/2013 |
| TW | M445528 | U | 1/2013 |
| TW | M447728 | U | 3/2013 |
| TW | M457395 | U | 7/2013 |
| TW | M461579 | U | 9/2013 |
| TW | M465327 | U | 11/2013 |
| TW | M468460 | U | 12/2013 |
| TW | I426172 | B | 2/2014 |
| TW | M473334 | U | 3/2014 |
| TW | M482929 | U | 7/2014 |
| TW | I451997 | B | 9/2014 |
| TW | M495402 | U | 2/2015 |
| TW | M510032 | U | 10/2015 |
| TW | M510957 | U | 10/2015 |
| TW | M511532 | U | 11/2015 |
| TW | M513817 | U | 12/2015 |
| TW | M515717 | U | 1/2016 |
| TW | M523987 | U | 6/2016 |
| TW | M525380 | U | 7/2016 |
| TW | M525979 | U | 7/2016 |
| TW | M527985 | U | 9/2016 |
| TW | M529210 | U | 9/2016 |
| TW | M533676 | U | 12/2016 |
| TW | M550940 | U | 10/2017 |
| TW | M554523 | U | 1/2018 |
| TW | M556271 | U | 3/2018 |
| TW | M559920 | U | 5/2018 |
| TW | M560503 | U | 5/2018 |
| TW | M568001 | U | 10/2018 |
| TW | M572919 | U | 1/2019 |
| TW | M574175 | U | 2/2019 |
| TW | M574813 | U | 2/2019 |
| TW | M582985 | U | 9/2019 |
| TW | M583967 | U | 9/2019 |
| TW | M593451 | U | 4/2020 |

* cited by examiner

1101

LOCK FOR SECURING A PORTABLE DEVICE

BACKGROUND OF THE INVENTION

Field of the Invention

The present invention is related to a locking mechanism, specifically, a locking mechanism for portable devices such as laptop computers and tablet computers for theft prevention.

Description of Related Art

In general, the locks for securing a portable device may have an engaging member protruding from the main body of the lock. A cross-section of the end portion of the engaging member is wider than a cross-section of the base portion of the engaging member. After the end portion of the locking element is inserted into the cavity, a moveable pin is then inserted into the cavity. The locking element and the moveable pin jointly occupy the entire space of the cavity so that the engaging member and the moveable pin are fixed in the cavity. In many instances, a key can be applied to lock or unlock the locking device.

Many of the prior arts have disclosed security locks in which the geometry of the cavity corresponds to the shape of the engaging member and the moveable pin. For example, the cavity may have a rectangular cross-section or a trapezoidal cross-section; and the combination of the engaging member and the moveable pin being inserted into the cavity also have a rectangular cross-section or a trapezoidal cross-section.

In order for lock to be applied to portable devices such as laptop computers or mobile devices, the size of the lock need to be reduced to suit the physical dimension of the portable devices. However, the strength of the lock degrades as the size of the engagement member decreases, which means, it may be easily broken or pulled open with excessive force. The present invention aims to improve the strength of the lock by providing engagement member having improved geometric structure to increase the strength of the lock.

SUMMARY

The present invention discloses a lock for securing a portable device configured to be able to insert into a cavity, and be fixed to the cavity. The present invention can provide better mechanical strength while having reduced production cost relative to the prior art. The lock for securing a portable device comprises a lock body; a first engaging member and a second engaging member. The first engaging member and the second engaging member are configured to be insertable into a cavity to fix the lock for securing the portable device to the cavity to achieve a locking status.

The first engaging member has a shape projecting from the lock body. The first engaging member may have an outside part which is located outside the lock body and an inside part which is located inside the lock body. In some embodiments, the lock body comprises a pivotal shaft, and the inside part of the first engaging member is coupled to the lock body via the pivotal shaft.

The outside part of the first engaging member can be divided into a front section and a rear section. The front section and the rear section are defined by different projecting angle relative to the lock body.

According to some embodiments of the present invention, the cross-sectional area of the outside part of the first engaging member is substantially the same through different plane of the first engaging member. In some embodiments, the front section and the rear section of have substantially the same cross-sectional area. In other embodiments, the cross-sectional area of the front section may be different from that of the rear section; however, the cross-sectional area within the front section may be uniform.

The second engaging member is connected to the lock body and configured to be able to move along a side of the first engaging member or move across the first engaging member to insert into the cavity for the locking status, and to withdraw from the cavity for the unlocking status. The movement of the second engaging member is controlled by a lock cylinder contained in the lock body.

In some embodiments, the lock cylinder is provided for containing a locking mechanism and a piston driven by the locking mechanism. The piston is configured to move axially relative to the lock cylinder and protrude from the lock cylinder in the locking status, and retract back to the lock cylinder in the unlocking status. The second engaging member is coupled to the piston via a moveable rack. In some embodiments, the moveable rack comprises a receiving member for coupling with an end of the piston. The moveable rack is adapted to move in an axial direction along with the piston to move the second engaging member to protrude from the lock body or retract partially or completely into the lock body. The locking mechanism is configured to be operated to actuate the locking status or the unlocking status of the lock for securing a portable device.

The cavity has a first sidewall and a second sidewall. A portion of the two sidewalls extend away from an opening into the cavity such that the distance between the two sidewalls gradually increases and having a first predetermined angle relative to a plane of the opening. The first engaging member and the second engaging member collectively do not substantially fill the cavity and bear against the first sidewall and the second sidewall when the first engaging member and the second engaging member are in the locking status. The space that is not substantially filled by the first engaging member and the second engaging member is a substantially triangular space which remains between the first engaging member and the second engaging member in the cavity in the locking status.

In some instances, the first sidewall or the second sidewall may be divided into several sections. Each of the sections may have a respective first predetermined angle relative to the plane of the opening. In some other embodiments, the cavity may resemble a trapezoidal shaped cross-section have an opening narrower than the interior of the cavity. In some embodiments, the sidewalls of the cavity may have multiple segments, each of which has a respective angle relative to the opening plane.

In some embodiments, the first engaging member comprises two branches extending from the rear section of the outside part of the first engaging member. The total sum of the cross-sectional area of the first engaging member in a plane is substantially the same throughout the structure of the first engaging member. In an alternative embodiment, the sum of the cross-sectional area of the first engaging member become larger from the front end of the front section towards the rear end of the front section; or the first engaging member may become larger from the front section to the rear section.

In some embodiments, the front end of the front section of the outside part of the first engaging member extends away from the second engaging member. The cross-sectional area of the first engaging member in a plane is substantially the same throughout the structure of the first engaging member. In an alternative embodiment, the cross-sectional area of the first engaging member become larger from the front end of the front section towards the rear end of the front section; or the first engaging member may become larger from the front section to the rear section.

In some embodiments, the front end of the front section of the first engaging member extends away from the second engaging member. The cross-sectional area of the first engaging member in a plane is substantially the same throughout the structure of the first engaging member. In an alternative embodiment, the cross-sectional area of the first engaging member become larger from the front end of the front section towards the rear end of the front section; or the first engaging member may become larger from the front section to the rear section.

In some embodiments, the front end of the front section of the outside part of the first engaging member extends toward the second engaging member. The cross-sectional area of the first engaging member in a plane is substantially the same throughout the structure of the first engaging member. In accordance with a variation of the present invention, the front section may have an L-shape structure, which consists additional twisted extension toward the front end. In an alternative embodiment, the cross-sectional area of the first engaging member become larger from the front end of the front section towards the rear end of the front section; or the first engaging member may become larger from the front section to the rear section.

In some embodiments, the front end of the front section of the outside portion of the first engaging member consists rounded corners or curves. The angle formed between the rear section and the front section of the first engaging member can be rounded and curved also.

In a variation of the present invention, the first engaging member and the second engaging member may respectively comprise a first portion with a first reduced thickness and a second portion with a reduced thickness. The first portion with a first reduced thickness of the first engaging member and the second portion with a reduced thickness of the second engaging member may have a thickness that is a fraction of the original thickness of the first engaging member and the second engaging member. The location and shape of the first portion with a first reduced thickness is configured for the area where the maximum width of the second engaging member to pass through in order for the second engaging member to extend from the lock body and retract back into the lock body.

DETAILED DESCRIPTION OF THE PREFERRED EMBODIMENTS

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section. Embodiments of the present invention will be described, by way of examples only, with reference to the accompanying drawings.

Although particular embodiments of the present invention have been described in detail for purposes of illustration, various modifications and enhancements may be made without departing from the spirit and scope of the present invention. Accordingly, the present invention is not to be limited except as by the appended claims.

Figure 1:
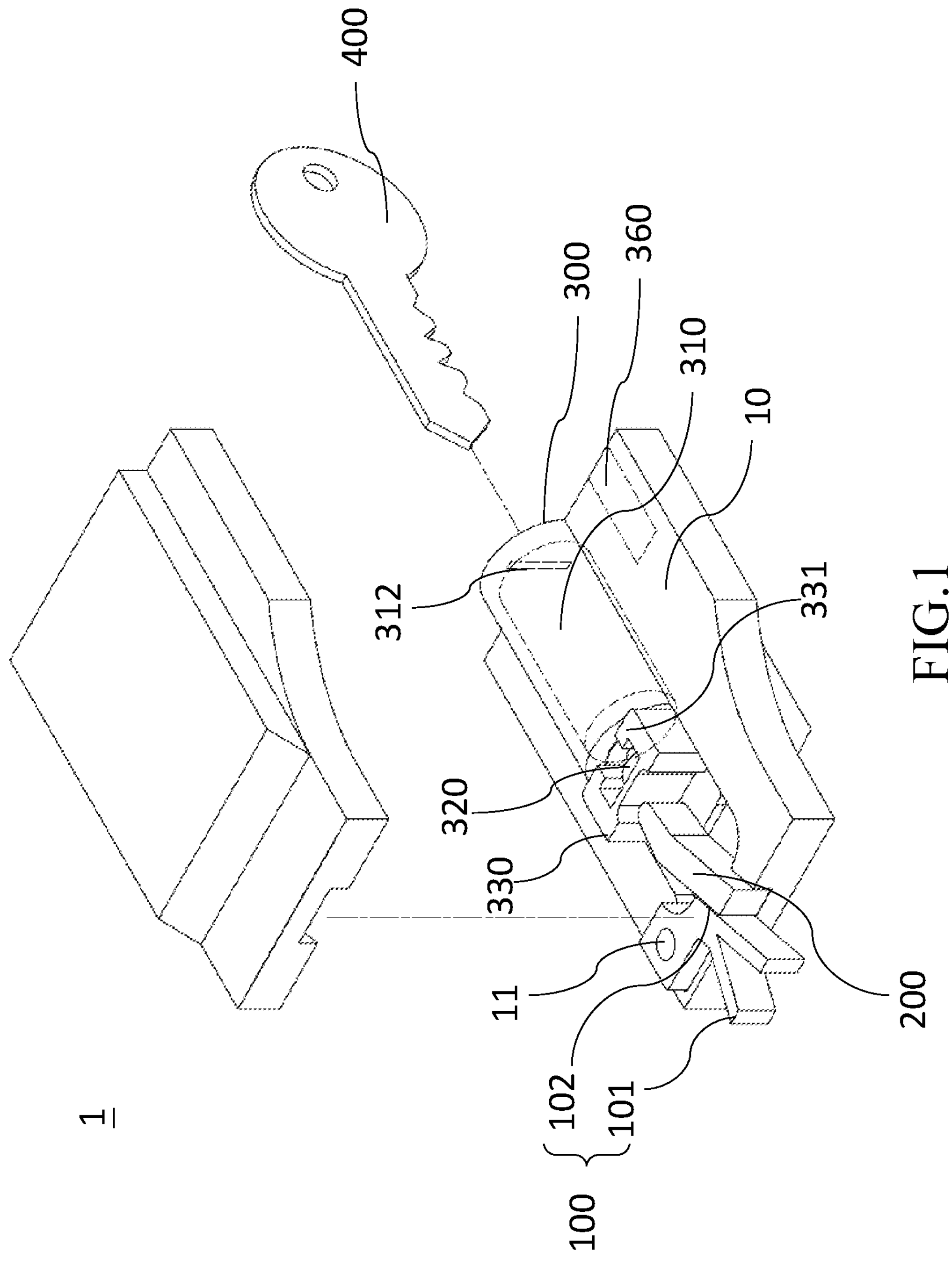
FIG. 1 is a schematic view of a lock for securing a portable device in accordance with the present invention.
Figure 2:
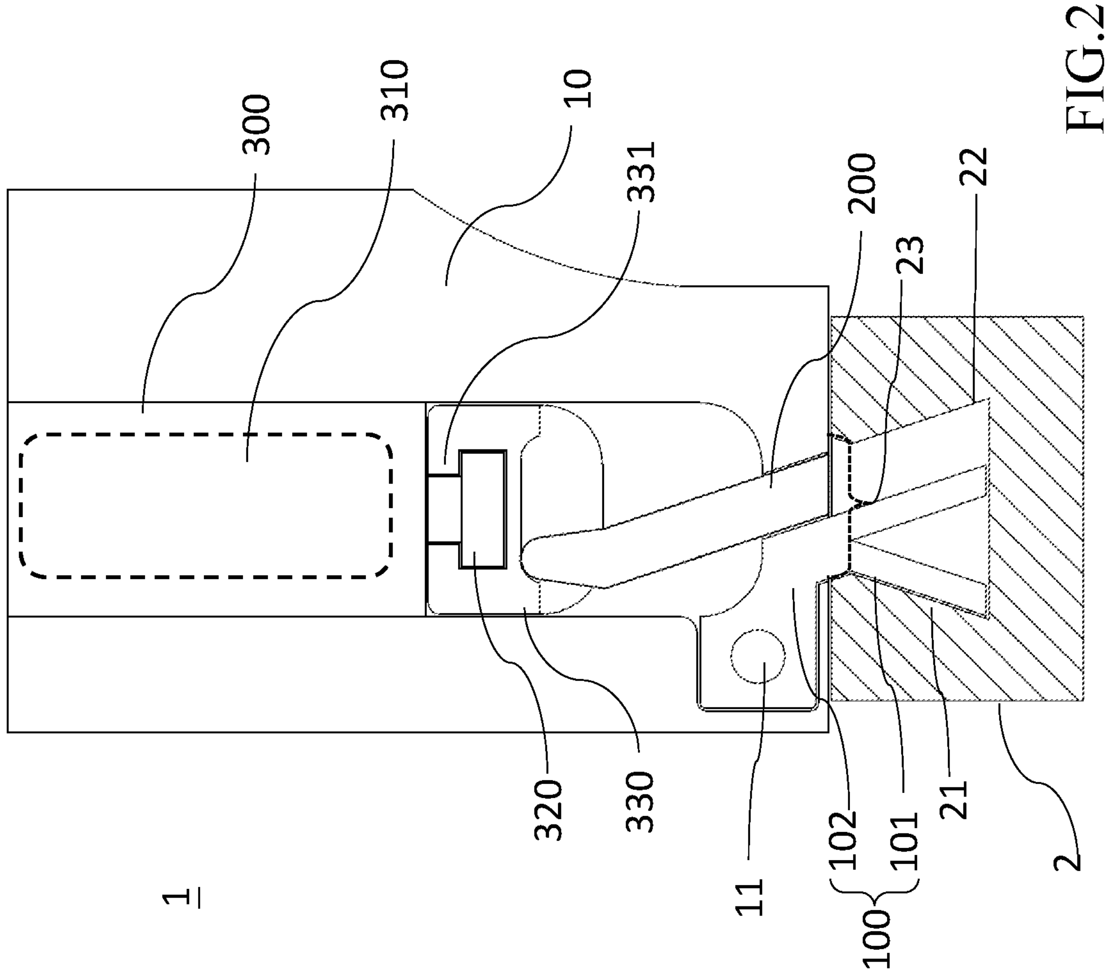
FIG. 2 is a schematic view showing the operation of the lock for securing a portable device in accordance with the present invention.
Figure 3:
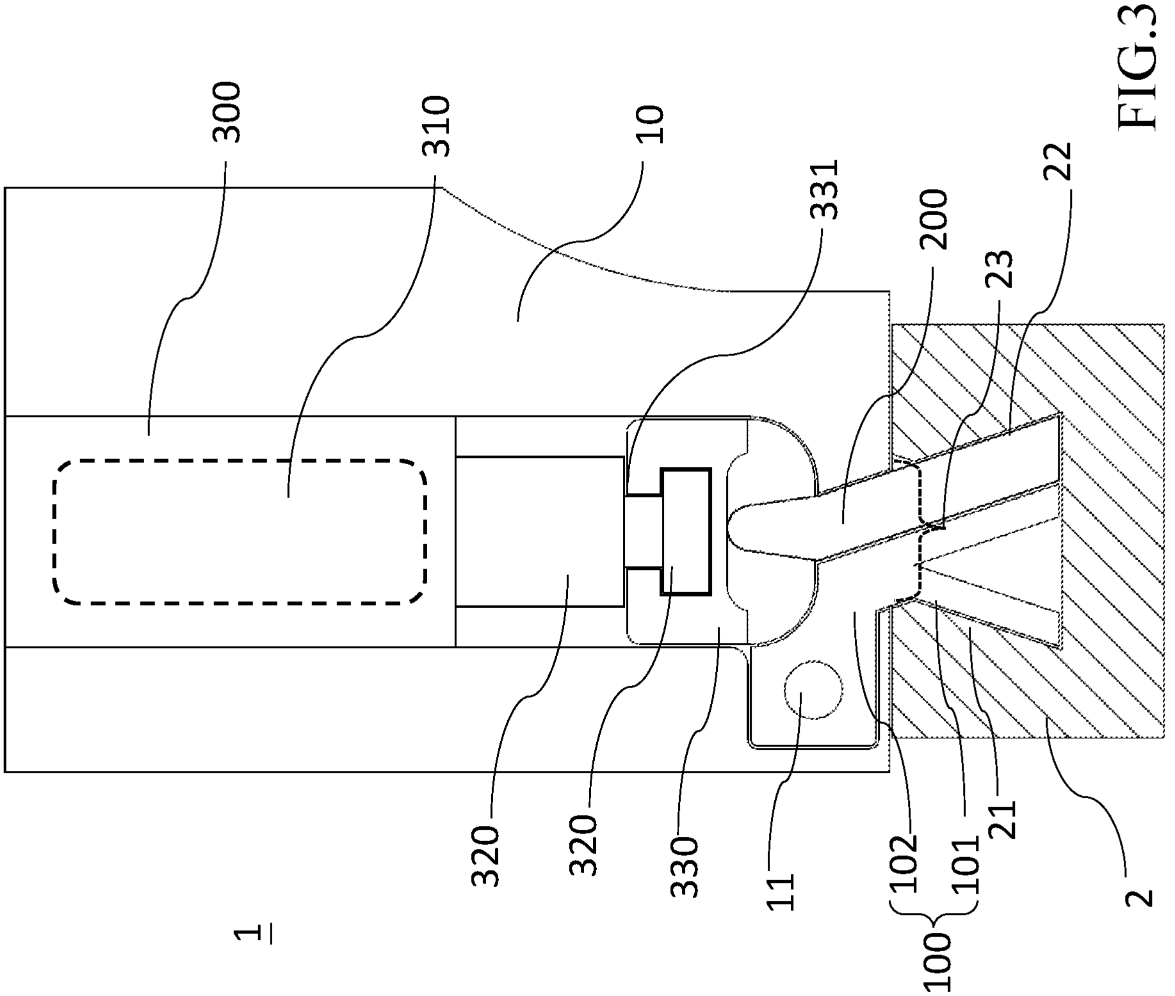
FIG. 3 is another schematic view showing the operation of the lock for securing a portable device in accordance with the present invention

With reference to FIGS. 1 to 3, a lock for securing a portable device 1 in accordance with the present invention comprises a lock body 10; a first engaging member 100 and a second engaging member 200. The first engaging member 100 and the second engaging member 200 are configured to be insertable into a cavity 2 to fix the lock for securing the portable device to the cavity 2, thereby, to achieve a locking status. The cavity 2 may be provided on a portable device or any items which the user wish to secure with the lock of the present invention. In some embodiments, the lock body 10 may further comprise a cable holder 360 for holding an end of a cable. As an example, the cable may be utilized to restrain the portable devices to certain physical locations for theft prevention. Specifically, in the case which the portable device is a public laptop computer in a library, an end of the cable may be fixed to a wall of an library to prevent theft activities.

The first engaging member 100 has a shape projecting from the lock body 10. The first engaging member 100 may have an outside part 101 which is located outside the lock body 10 and an inside part 102 which is located inside the lock body 10. In some instances, the lock body 10 comprises a pivotal shaft 11, and the inside part 102 of the first engaging member 100 is coupled to the lock body 10 via the pivotal shaft 11.

Figure 4:
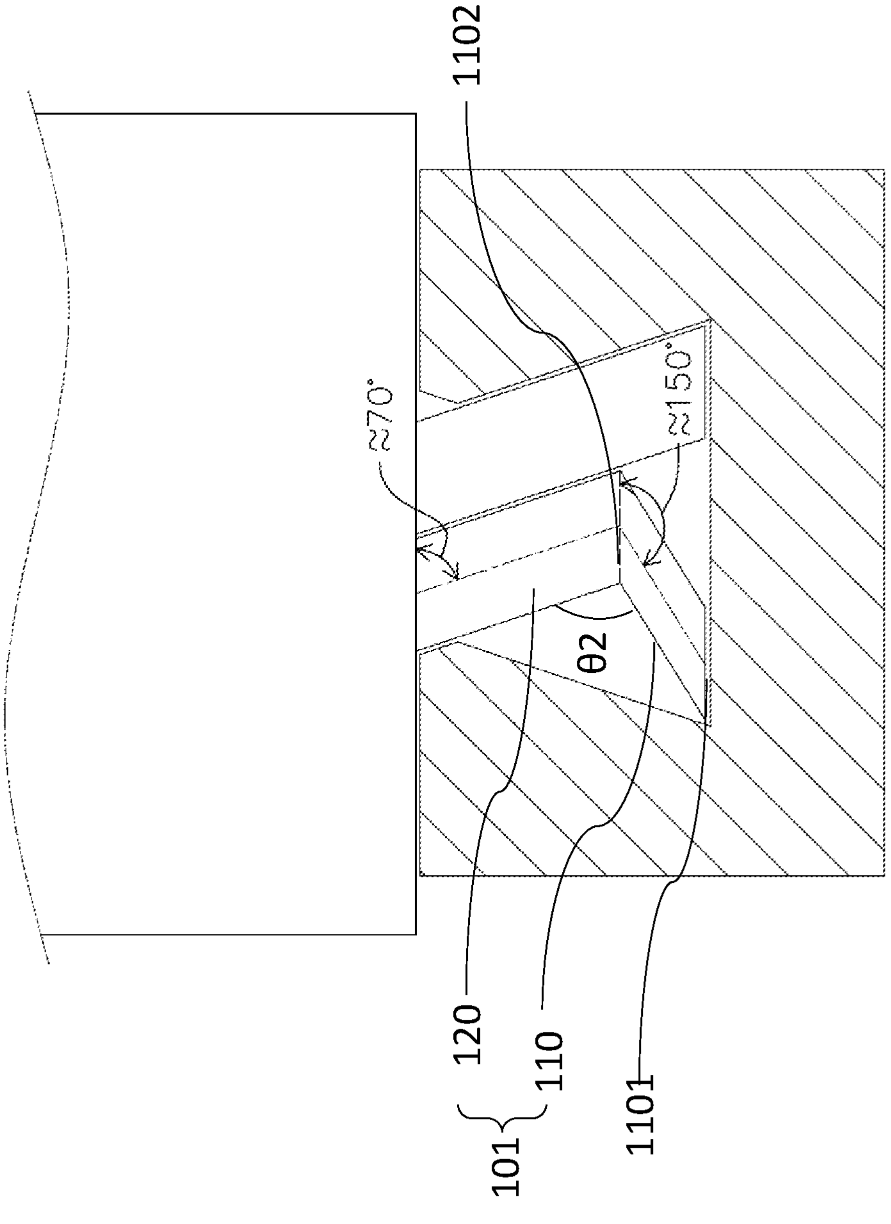
FIG. 4 is a schematic view showing the components of the first engaging member and the second engaging member.

With reference to FIG. 4, the outside part 101 of the first engaging member 100 can be divided into at least two sections, for instance, a front section 110 and a rear section 120. The front section 110 and the rear section 120 are defined by different projecting angle relative to the lock body 10. For example, as shown in FIG. 4, the front section 110 has a projecting angle of approximately 150 degrees relative to the lock body 10, whereas the rear section 120 has a projecting angle of approximately 70 degrees relative to the lock body 10. The boundary of the rear section 120 and the front section 110 is defined by the place where the change of projecting angle occurs. An angle can be formed between the front section 110 and the rear section 120 of the first engaging member 100. In other words, as shown in FIG. 4, the rear section 120 and the front section 110 forms a second predetermined angle θ2 therebetween.

A cross-sectional area of the outside part 101 of the first engaging member 100 may be varied in accordance with various embodiments of the present invention. With reference to FIGS. 5-8, according to some embodiments of the present invention, the cross-sectional area of the outside part 101 of the first engaging member 100 is substantially the same through different plane of the first engaging member 100. In some embodiments, the front section 110 and the rear section 120 of have substantially the same cross-sectional area. As shown in FIGS. 5-8, the cross-sectional area at A-B is substantially the same as the cross-sectional area at A'-B'. The width (or thickness) of the first engaging members 100 is substantially uniform throughout the entire structure of the first engaging member 100. In other embodiments, the cross-sectional area of the front section 110 may be different from that of the rear section 120; however, the cross-sectional area within the front section 110 may be uniform.

Further with reference to FIGS. 9-12, according to other embodiments of the present invention, the cross-sectional area of the first engaging member 100 become larger from a front end 1101 of the front section 110 towards a rear end 1102 of the front section 110. As shown in FIGS. 9-12 the cross-sectional area at A-B is larger than the cross-sectional area at A'-B'. The width (or thickness) of the first engaging member 100 become larger from the front end 1101 of the front section 110 towards the rear end 1102 of the front section 110. In other embodiments, the cross-sectional area of the entire first engaging member 100 become larger from a front section 110 toward the rear section 120.

With reference to FIGS. 1-3 again, the second engaging member 200 is connected to the lock body 10 and configured to be able to move along a side of the first engaging member 100 or move across the first engaging member 100 to insert into the cavity 2 for the locking status, and to withdraw from the cavity 2 for the unlocking status. The movement of the second engaging member 200 is controlled by a lock cylinder 300 contained in the lock body 10. More specifically, in some embodiments, the lock cylinder 300 is provided for containing a locking mechanism 310 and a piston 320 driven by the locking mechanism 310. The piston 320 is configured to move axially relative to the lock cylinder 300 and protrude from the lock cylinder 300 in the locking status, and retract back to the lock cylinder 300 in the unlocking status. The second engaging member 200 is coupled to the piston 320 via a moveable rack 330. In some embodiments, the moveable rack 330 comprises a receiving member 331 for coupling with an end of the piston 320. The moveable rack 330 is adapted to move in an axial direction along with the piston 320 to move the second engaging member 200 to protrude from the lock body 10 or retract partially or completely into the lock body 10. The locking mechanism 310 is configured to be operated to actuate the locking status or the unlocking status of the lock for securing a portable device 1. For instance, the locking mechanism 310 may comprise a keyhole 312 for inserting a key 400 thereinto. The locking mechanism 310 described here may be any locking mechanisms well known in the art. After the key 400 is inserted into the keyhole 312, the key 400 may be pushed or turned to cause the locking mechanism 310 to drive the piston 320 in the axial direction. As an example, the key 400 may be turned from a default position by a user to cause the locking mechanism 310 to drive the piston 320 to protrude from the lock cylinder 300; consequently, the piston 320 pushes the moveable rack 330 to drive the second engaging member 200 to protrude from the lock body 10, creating the locking status, as shown in FIG. 3. The key 400 may be turned back to the default position (as shown in FIG. 2) by the user to cause the locking mechanism 310 to retract the piston 320 to the lock cylinder 300; consequently, the piston 320 pulls the moveable rack 330 to drive the second engaging member 200 to retract partially or completely into the lock body 10, creating the unlocking status. In some embodiments, the locking mechanism 310 may be a combination lock to switch between the locking status and the unlocking status.

With reference to FIGS. 2-3 again, the lock for securing a portable device 1 in accordance with the present invention is configured to be insertable into the cavity 2. The cavity 2 has a first sidewall 21 and a second sidewall 22. A portion of the two sidewalls extend away from an opening into the cavity 2 such that the distance between the two sidewalls gradually increases, and having a first predetermined angle θ1 relative to a plane of the opening. After both the first engaging member 100 and the second engaging member 200 are inserted into the cavity 2, both of which engage and are fixed to the first sidewall 21 and/or the second sidewall 22; so the cavity 2, the first engaging member 100 and the second engaging member 200 are in the locking status. In order for the first engaging member 100 and the second engaging member 200 to be fixed securely in the cavity 2, the geometry of the cavity 2, the first engaging member 100 and the second engaging member 200 are specially designed so that a portion of the first engaging member 100 abuts against a sidewall (first sidewall 21 and/or the second sidewall 22) of the cavity 2 for preventing the first engaging member 100 to be withdrawn from the cavity 2 when a force is applied to the first engaging member 100 and/or the second engaging member 200 to direct the first engaging member 100 and/or the second engaging member 200 away from the cavity 2. More specifically, with reference to FIGS. 2-3, in order to secure and fix the first and second engaging member in the cavity 2, the second engaging member 200 is initially in a retracted state (as shown in FIG. 2). The first engaging member 100 is inserted into the cavity 2 first. The second engaging member 200 is than driven and pushed into the cavity 2 such that the second engaging member 200 partially fill the remaining space of the entire cavity 2. In some embodiments, after both the first engaging member 100 and the second engaging member 200 are inserted into the cavity 2, a side of the second engaging member 200 partially in contact with a side of the first engaging member 100. Therefore, the second engaging member 200 may apply a pressure on the first engaging member 100 to cause a portion of the first engaging member 100 abutting against a portion of the sidewall of the cavity 2 for preventing the first engaging member 100 and the second engaging member 200 to be withdrawn from the cavity 2. In other embodiments, after the second engaging member 200 is inserted into the cavity 2, the second engaging member 200 at least partially occupy the remaining space of the cavity 2 such that the first engaging member 100 cannot move freely within the cavity 2. However, the first engaging member 100 and the second engaging member 200 collectively do not substantially fill the cavity 2 and bear against the first sidewall 21 and the second sidewall 22 when the second engaging member 200 is in the locking status. The space that is not substantially filled by the first engaging member 100 and the second engaging member 200 is a substantially triangular space which remains between the first engaging member 100 and the second engaging member 200 in the cavity 2 in the locking status.

Figure 11:
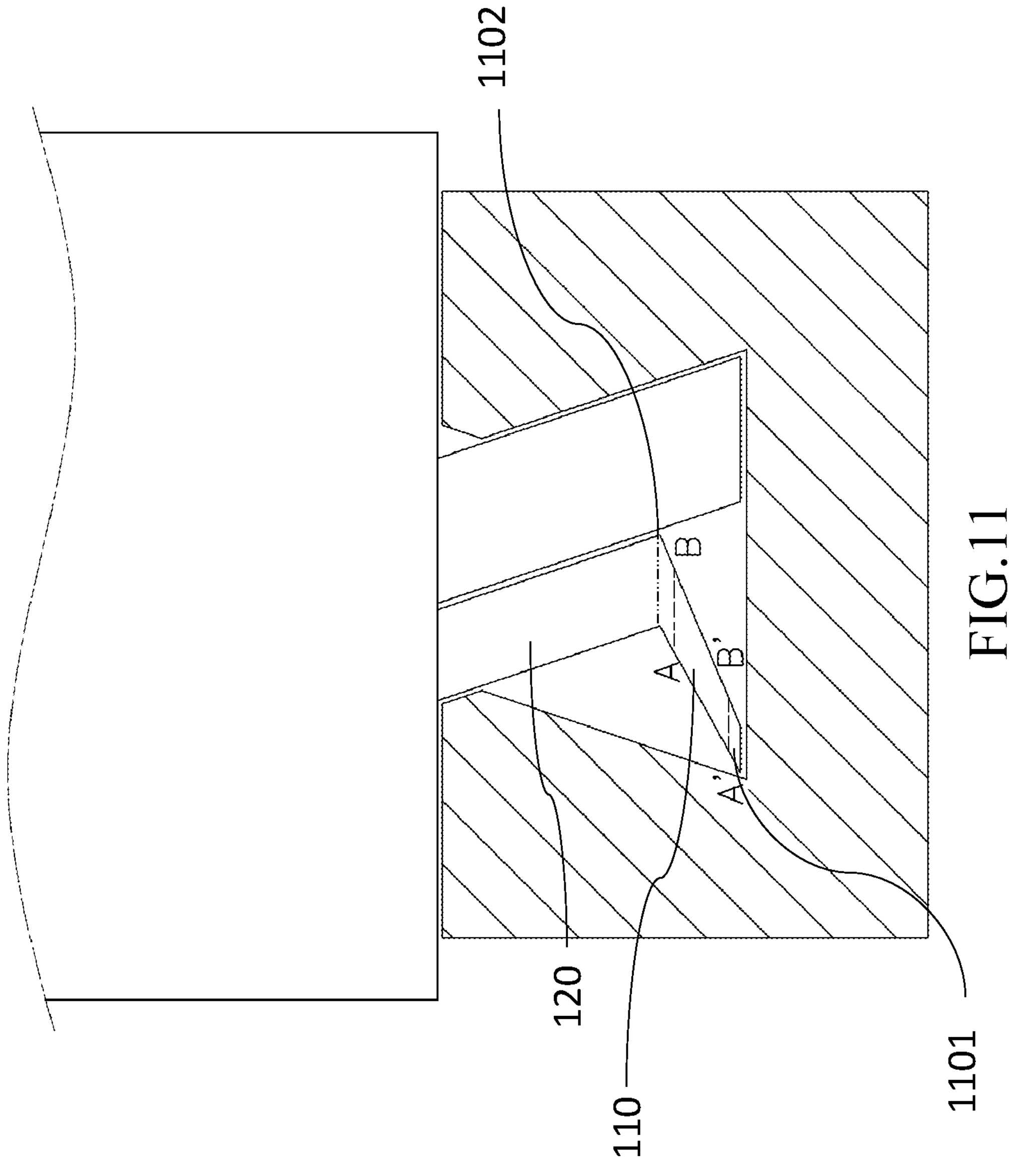
FIG. 11 is another schematic view illustrating an embodiment of the lock for securing a portable device.
Figure 12:
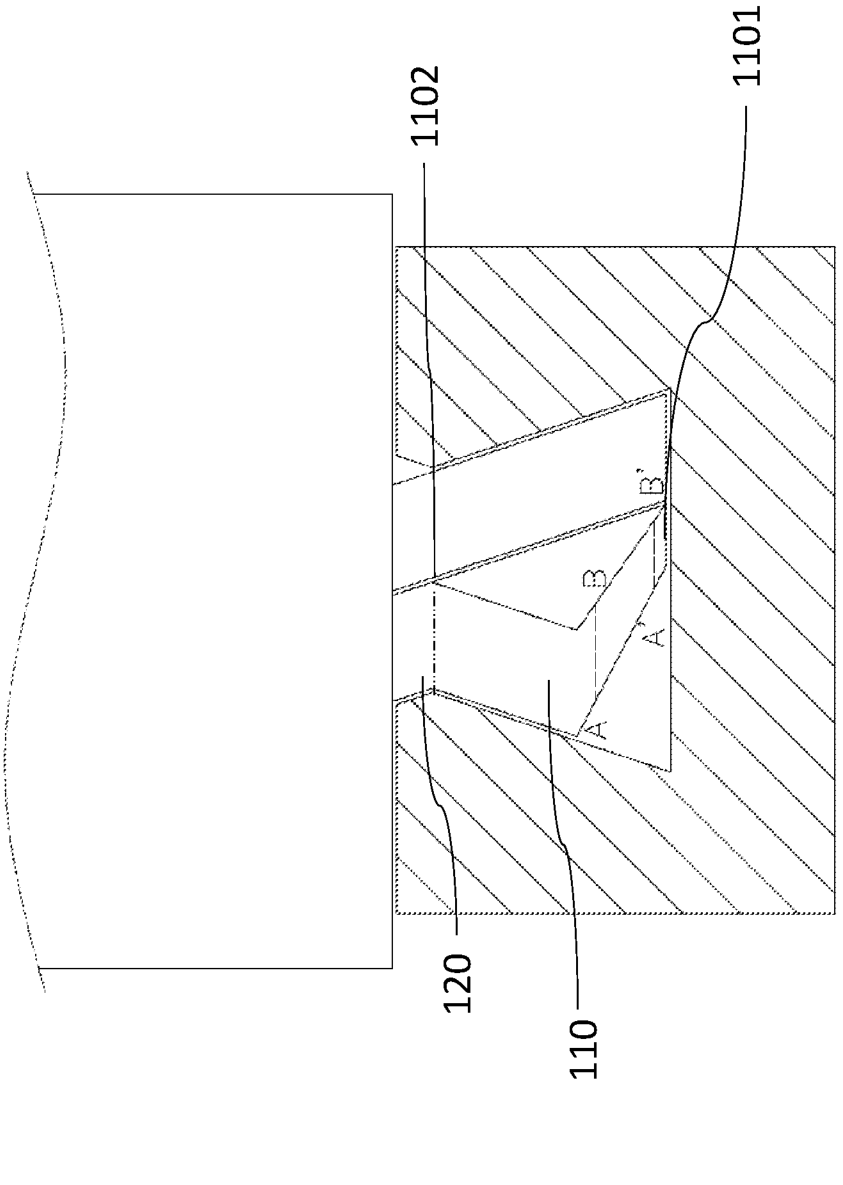
FIG. 12 is another schematic view illustrating an embodiment of the lock for securing a portable device.
Figure 13A:
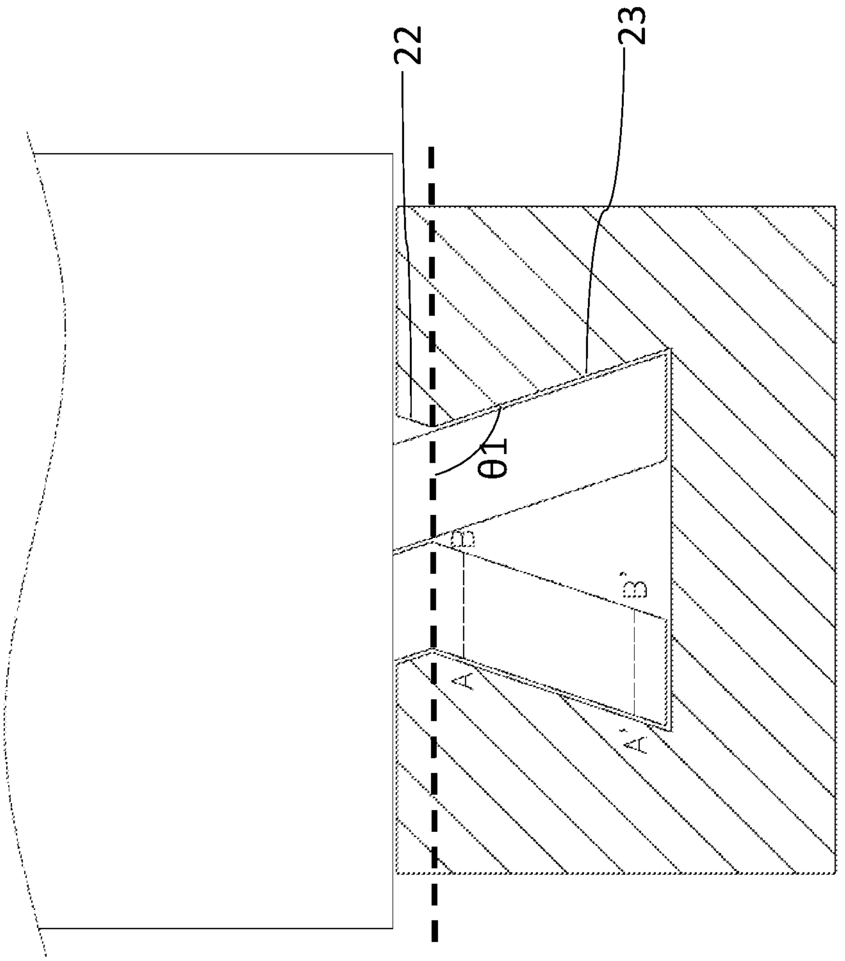
FIG. 13A is a schematic view illustrating an embodiment of the cavity.
Figure 13B:
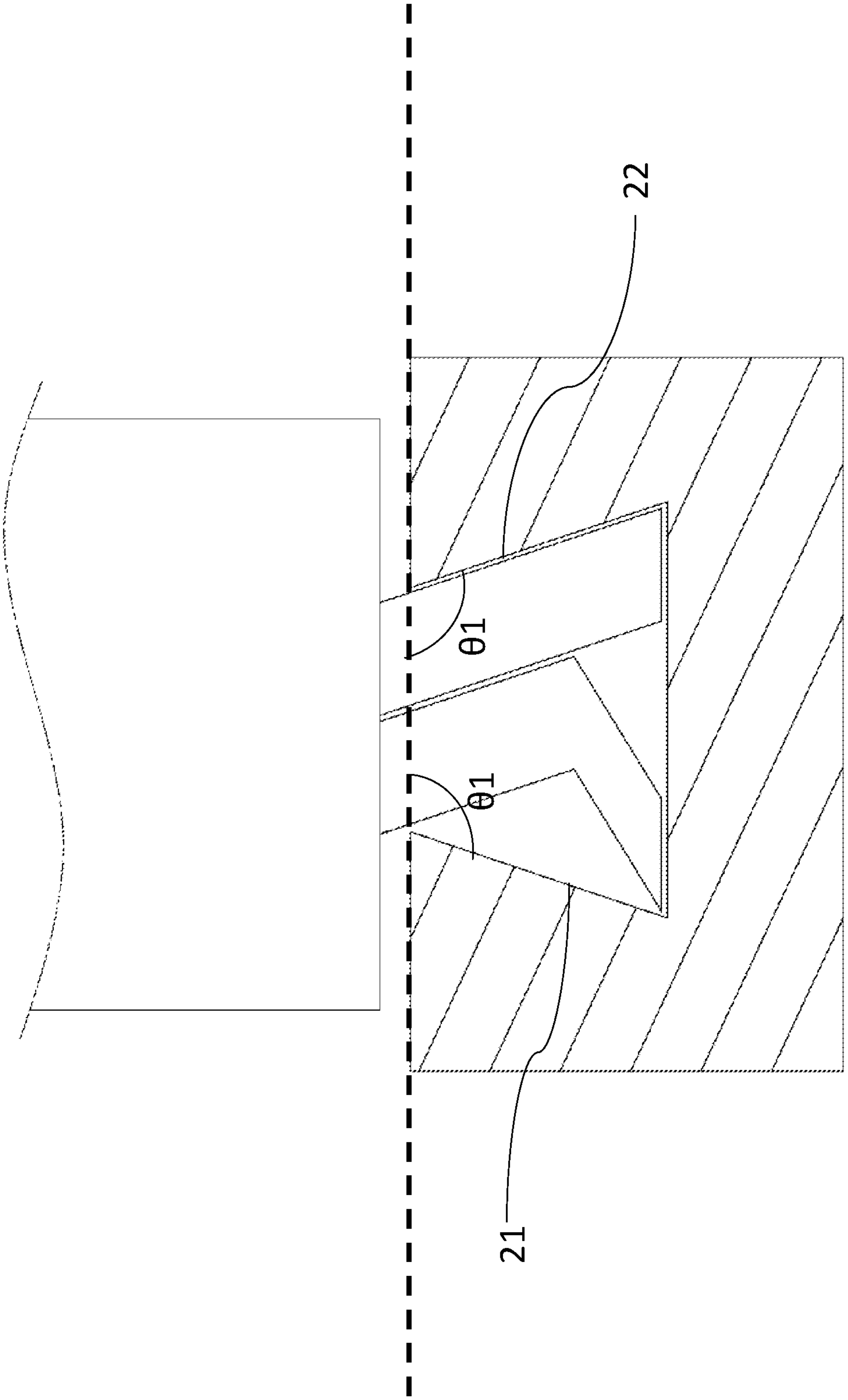
FIG. 13B is another schematic view illustrating an embodiment of the cavity.
Figure 14B:
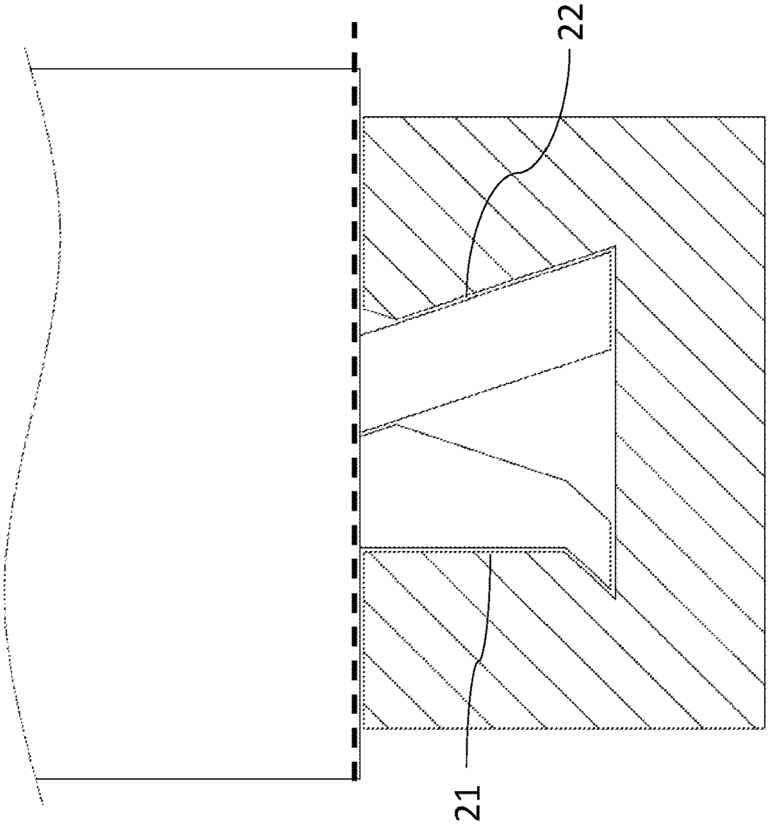
FIG. 14B is another schematic view illustrating an embodiment of the cavity.
Figure 14A:
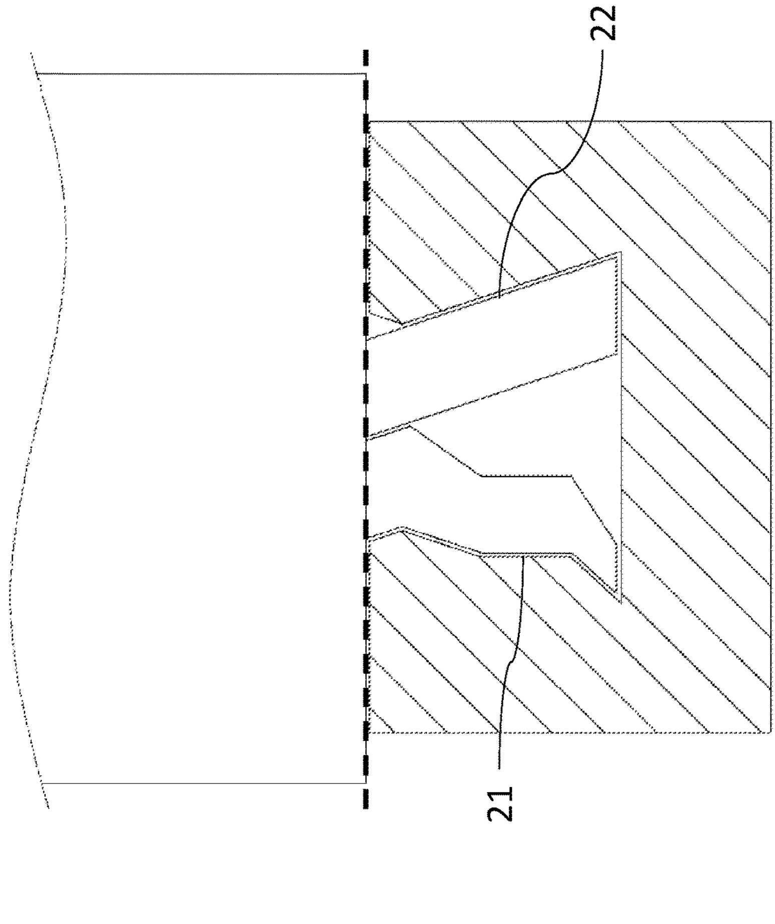
FIG. 14A is another schematic view illustrating an embodiment of the cavity.

The geometry of the cavity 2 is not limited to a specific shape. In some instances, the first sidewall 21 or the second sidewall 22 may be divided into several sections. Each of the sections may have a respective first predetermined angle θ1 relative to the plane of the opening 23. As shown in FIGS. 5-12, the shape of the cavity may have a substantially trapezoidal shaped cross-section with a slightly widen opening. The distance between the two sidewalls may become smaller in a first section 22 and then becomes larger in a second section 23 when both sidewalls extend away from an opening into the cavity. The second section 23 has a first predetermined angle θ1 larger than 90 degrees relative to the plane of the opening, as shown in FIG. 13A. In some other embodiments, the cavity 2 may resemble a trapezoidal shaped cross-section have an opening 23 narrower than the interior of the cavity 2, as shown in FIG. 13B. In this embodiment, the first sidewall 21 or the second sidewall 22 may have a first predetermined angle θ1 larger than 90 degrees relative to the plane of the opening 23. In some embodiments, with reference to FIG. 14A, the sidewalls of the cavity 2 may have multiple segments, each of which has a respective angle relative to the opening plane. Furthermore, with reference to FIG. 14B, the sidewall and one side of the cavity 2 does not need to be symmetric to the sidewall on other side of the cavity 2. As shown in FIGS. 13A, 13B, and 14, the plane of the opening is defined to be a virtual flat plane completely covers the opening of the cavity 2. The cavity 2 shown here are just for exemplary purpose; other configuration of the cavity 2 may also be possible in other embodiments.

With reference to FIGS. 5, 6, 8, 9, 10, and 12, in some embodiments, the first engaging member 100 comprises a plurality of sides which have angles (relative to the plane of the opening) partially matching the angle of the first sidewall 21 and/or the second sidewall 22 such that the first engaging member 100 and/or the second engaging member 200 can abut against the first sidewall 21 and/or the second sidewall 22 when a force is applied to withdraw the lock body 10 (which in turn the first engaging member 100 and/or the second engaging member 200) away from the cavity 2. However, in some embodiments (FIGS. 7 and 11), none of the sides of the first engaging member 100 has an angle match the angle of the first sidewall 21 and/or the second sidewall 22.

Figure 15:
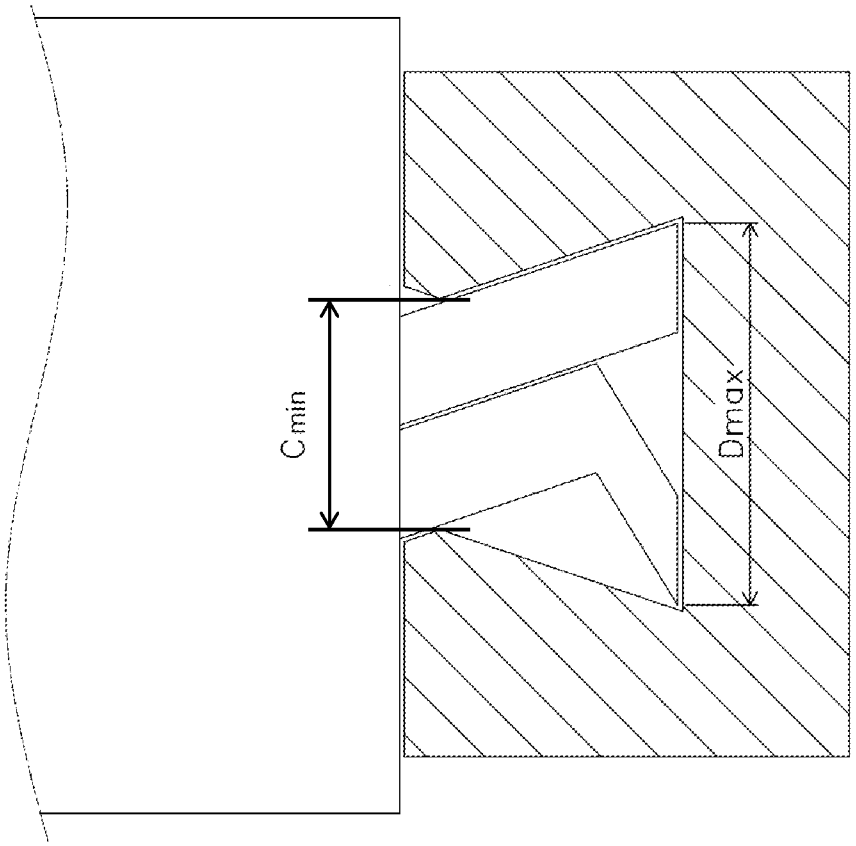
FIG. 15 is schematic view explaining the relations between the first engaging member, the second engaging member, and the cavity.
Figure 16:
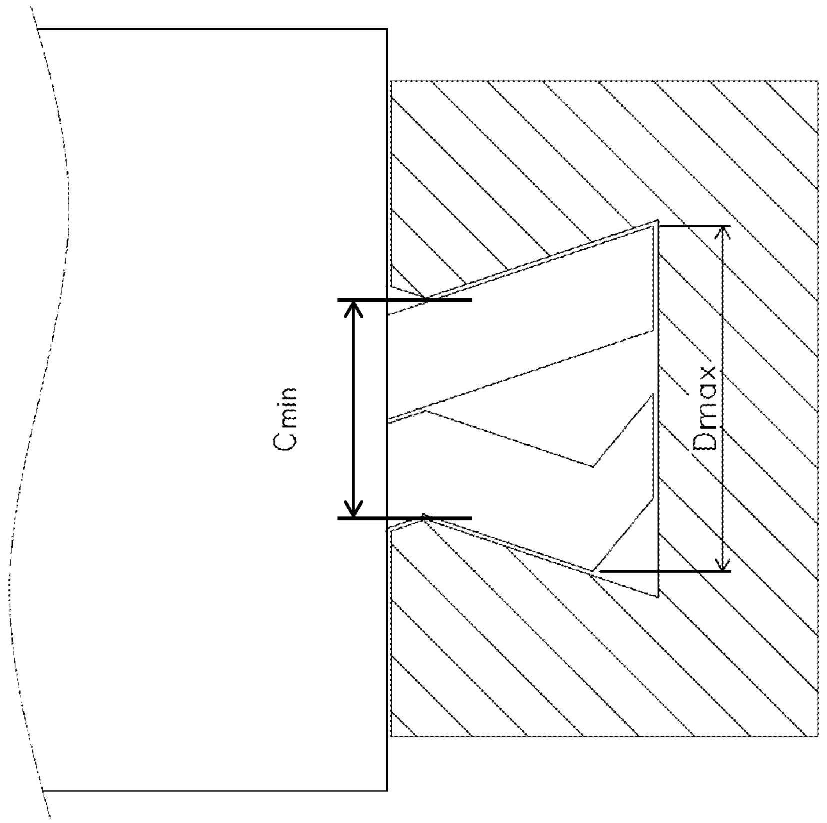
FIG. 16 is another schematic view explaining the relations between the first engaging member, the second engaging member, and the cavity.

With reference to FIGS. 15 and 16, in general, the first engaging member 100 and the second engaging member 200 may be consisted of a verities of geometric shapes. The maximum extension dimension is defined as the maximum distance between two end points of the first and second engaging member 100, 200 combined in a dimension. In the present invention, the maximum extension dimension along the plane of opening is considered. In FIGS. 15 and 16, the maximum extension dimensions are denoted as $D_{max}$. In some embodiments in accordance with the present invention, the sum of the maximum extension dimensions of the first engaging member 100 and the second engaging member 200 inside the cavity 2 is larger than the minimum dimension of the opening $C_{min}$ of the cavity 2, so as to prevent the first engaging member 100 and the second engaging member 200 being withdrawn from the cavity 2 at the same time.

Figure 5:
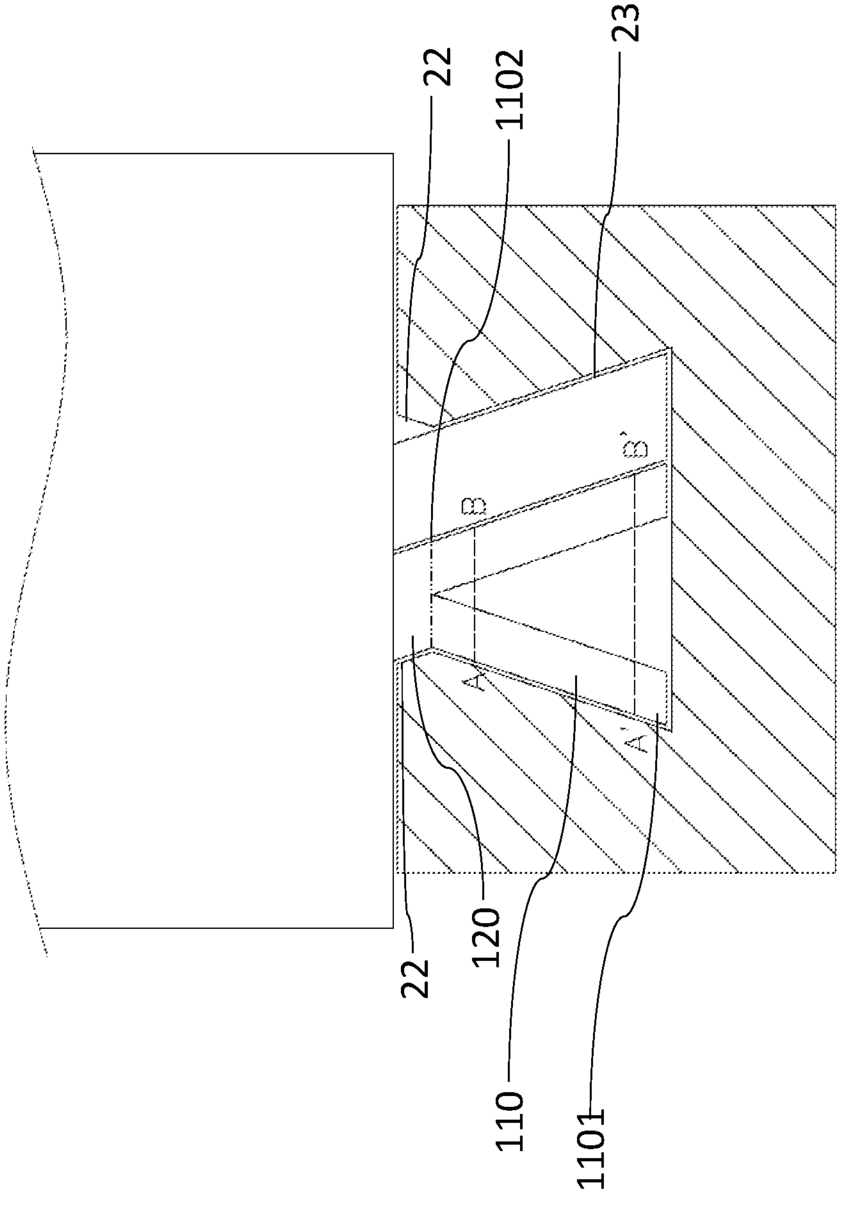
FIG. 5 is a schematic view illustrating an embodiment of the lock for securing a portable device.
Figure 7:
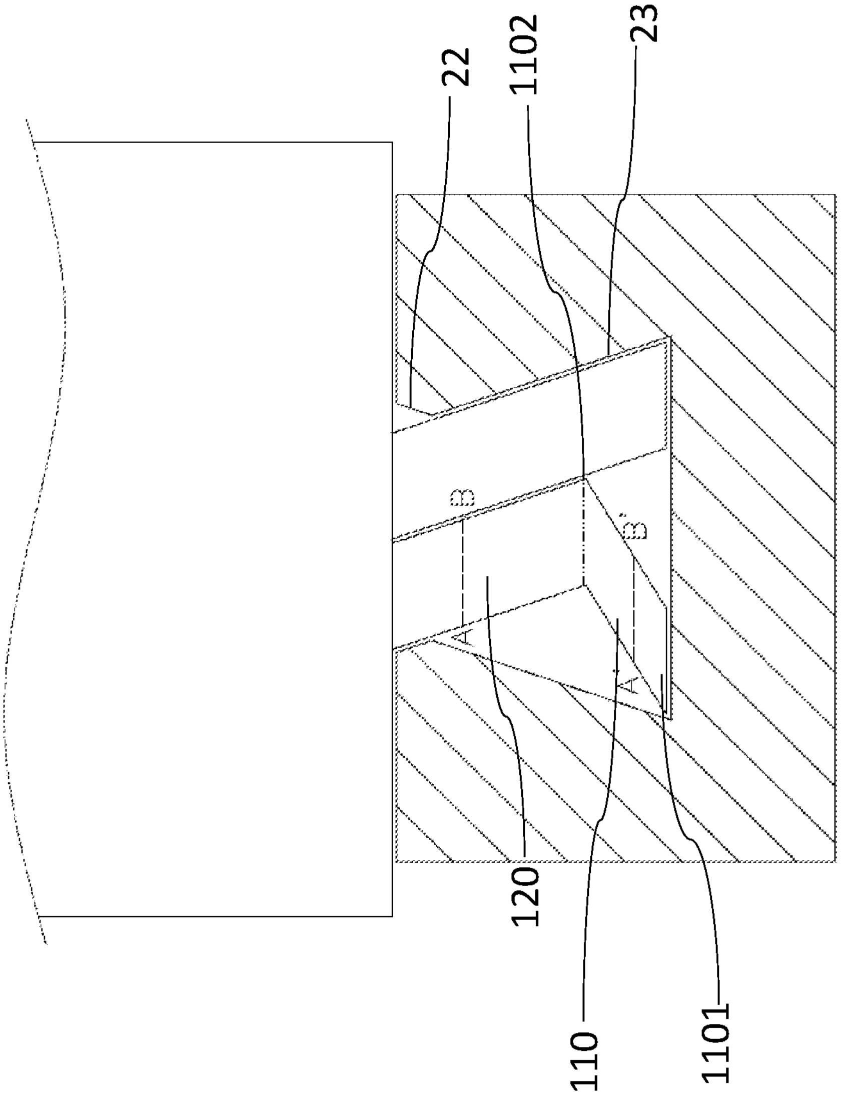
FIG. 7 is another schematic view illustrating an embodiment of the lock for securing a portable device.
Figure 8:
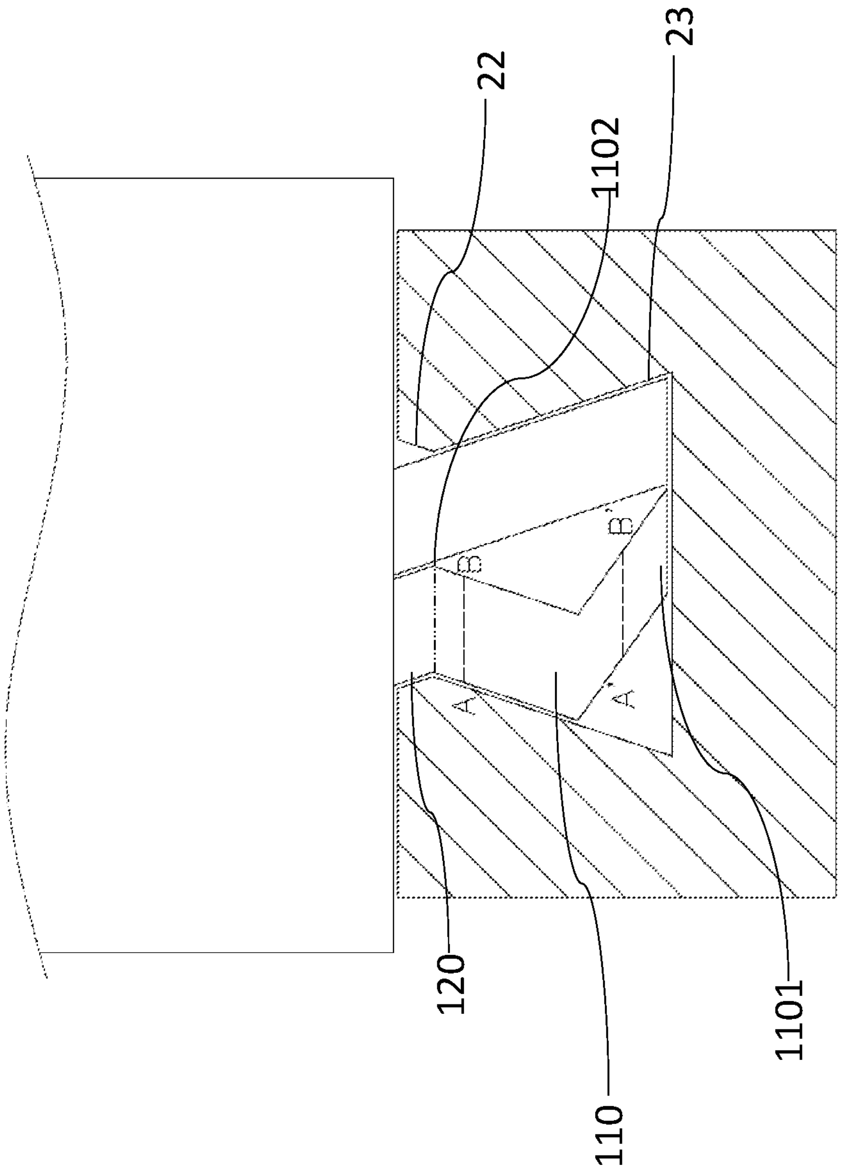
FIG. 8 is another schematic view illustrating an embodiment of the lock for securing a portable device.
Figure 9:
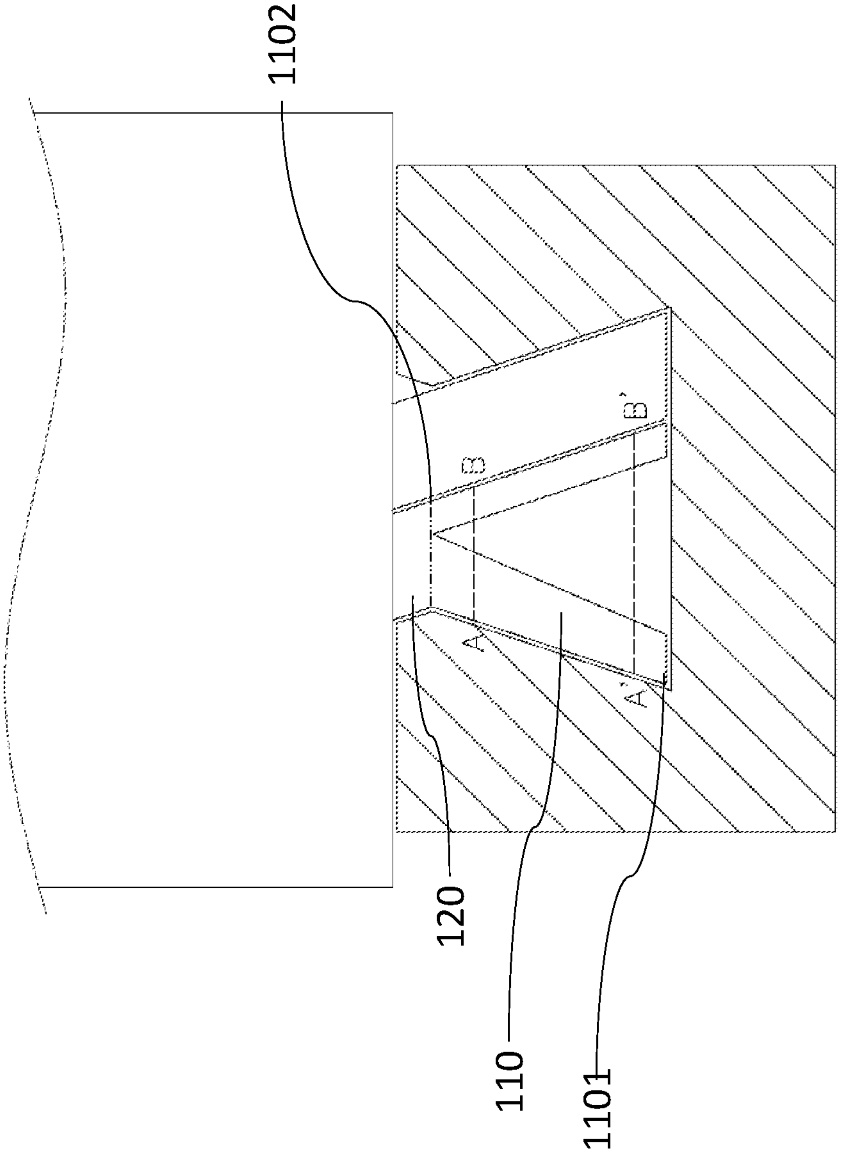
FIG. 9 is another schematic view illustrating an embodiment of the lock for securing a portable device.

FIGS. 5-12 illustrate several embodiments for the geometry of the first engaging member 100 in accordance with the present invention. With reference to FIG. 5, the first engaging member comprises two branches extending from the rear section 120 of the outside part 101 of the first engaging member. Although the end of the first engaging member is separated into two branches, the total sum of the cross-sectional area of the first engaging member 100 in a plane is substantially the same throughout the structure of the first engaging member. As shown in FIG.5, the sum of the cross-sectional area at A-B (excluding the empty space within the cavity) is substantially the same as the cross-sectional area at A'-B' (excluding the empty space within the cavity). With reference to FIG. 9, in an alternative embodiment, the sum of the cross-sectional area (excluding the empty space within the cavity) of the first engaging member 100 become larger from the front end 1101 of the front section 110 towards the rear end 1102 of the front section 110; or the first engaging member 100 may become larger from the front section 110 to the rear section 120. In these two embodiments, a side of the first engaging member abuts against the sidewall of the cavity 2; and the space of the cavity 2 is not substantially filled by the branches of the first engaging member 100 and the second engaging member 200.

Figure 6:
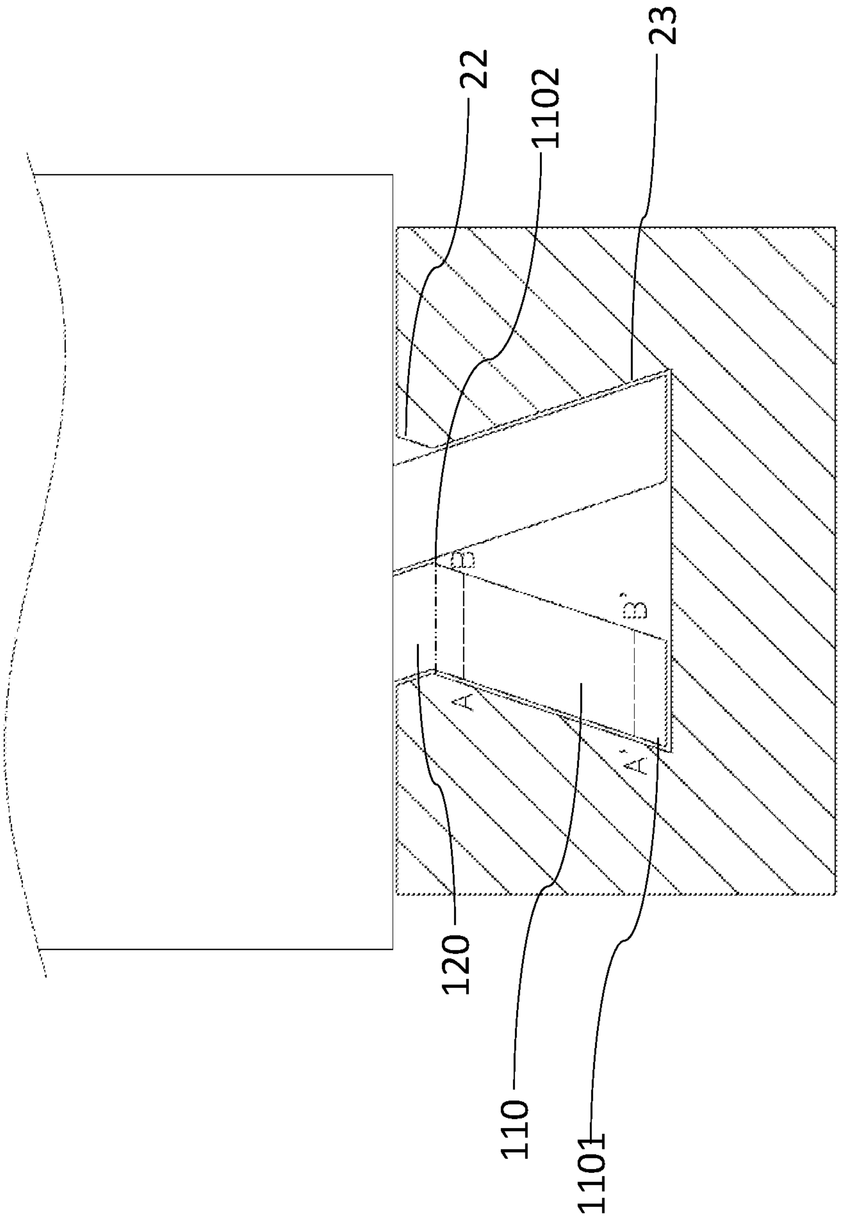
FIG. 6 is another schematic view illustrating an embodiment of the lock for securing a portable device.
Figure 10:
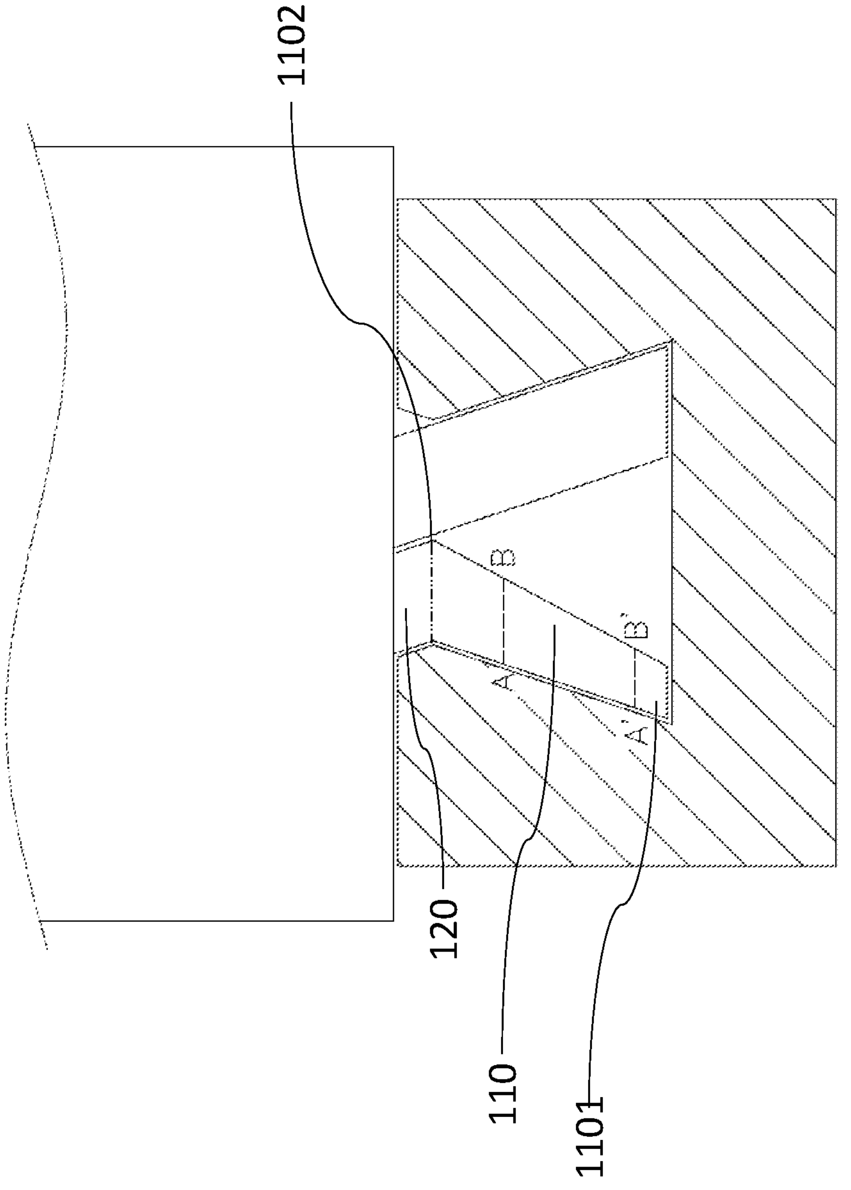
FIG. 10 is another schematic view illustrating an embodiment of the lock for securing a portable device.

With reference to FIG. 6, in some embodiments, the front end 1101 of the front section 110 of the outside part 101 of the first engaging member extends away from the second engaging member 200. The cross-sectional area of the first engaging member 100 in a plane is substantially the same throughout the structure of the first engaging member. As shown in FIG. 6, the cross-sectional area at A-B is substantially the same as the cross-sectional area at A'-B'. With reference to FIG. 10, in an alternative embodiment, the cross-sectional area of the first engaging member 100 become larger from the front end 1101 of the front section 110 towards the rear end 1102 of the front section 110; or the first engaging member 100 may become larger from the front section 110 to the rear section 120. In these two embodiments, a side of the first engaging member abuts against the sidewall of the cavity 2; and the space of the cavity 2 is not substantially filled by the first engaging member 100 and the second engaging member 200.

With reference to FIG. 7, in some embodiments, the front end 1101 of the front section 110 of the first engaging member extends away from the second engaging member 200. The cross-sectional area of the first engaging member 100 in a plane is substantially the same throughout the structure of the first engaging member. As shown in FIG. 7, the cross-sectional area at A-B is substantially the same as the cross-sectional area at A'-B'. With reference to FIG. 11, in an alternative embodiment, the cross-sectional area of the first engaging member 100 become larger from the front end 1101 of the front section 110 towards the rear end 1102 of the front section 110; or the first engaging member 100 may become larger from the front section 110 to the rear section 120. In these two embodiments, only a portion of the side of the first engaging member abuts against the sidewall of the cavity 2; in other words, none of the sides of the first engaging member has an angle match the angle of the first sidewall 21 and/or the second sidewall 22. In this case, the space of the cavity 2 is also not substantially filled by the first engaging member 100 and the second engaging member 200.

With reference to FIG. 8, in some embodiments, the front end 1101 of the front section 110 of the outside part 101 of the first engaging member extends toward the second engaging member 200. The cross-sectional area of the first engaging member 100 in a plane is substantially the same throughout the structure of the first engaging member. As shown in FIG. 8, the cross-sectional area at A-B is substantially the same as the cross-sectional area at A'-B'. In accordance with a variation of the present invention, the front section 110 may have an L-shape structure, which consists additional twisted extension toward the front end 1101. With reference to FIG. 12, in an alternative embodiment, the cross-sectional area of the first engaging member 100 become larger from the front end 1101 of the front section 110 towards the rear end 1102 of the front section 110; or the first engaging member 100 may become larger from the front section 110 to the rear section 120. The front section 110 in FIG. 12 also has an L-shape structure. In these two embodiments, only a portion of the side of the first engaging member abuts against the sidewall of the cavity 2; none of the sides of the first engaging member has an angle match the angle of the first sidewall 21 and/or the second sidewall 22. In this case, the space of the cavity 2 is also not substantially filled by the first engaging member 100 and the second engaging member 200.

Figure 17B:
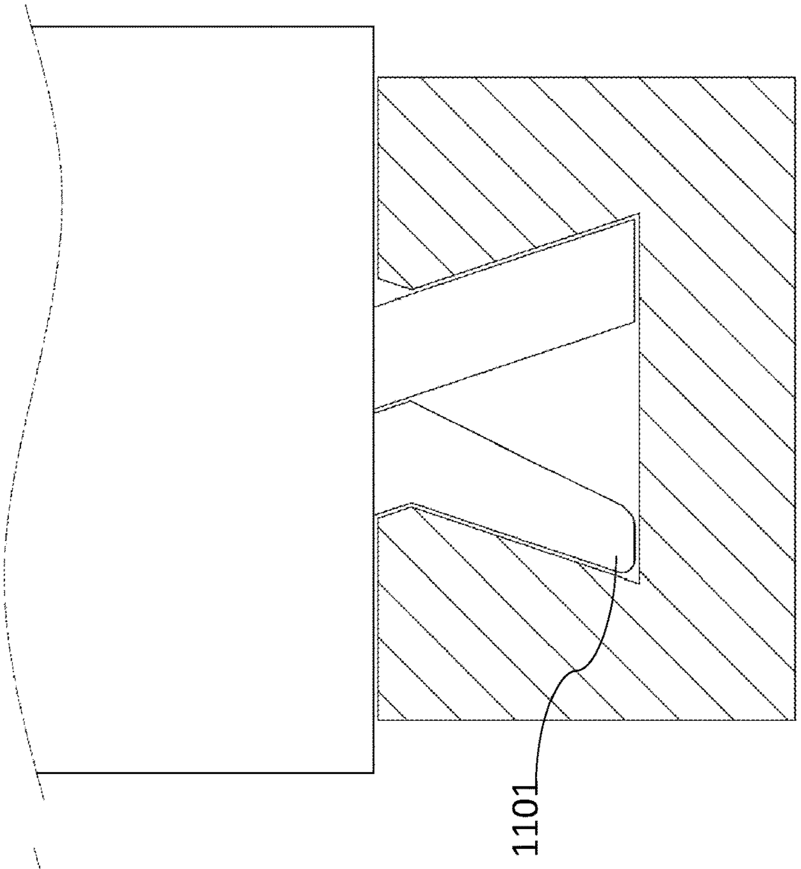
FIG. 17B is another schematic view illustrating an embodiment of the lock for securing a portable device.
Figure 17A:
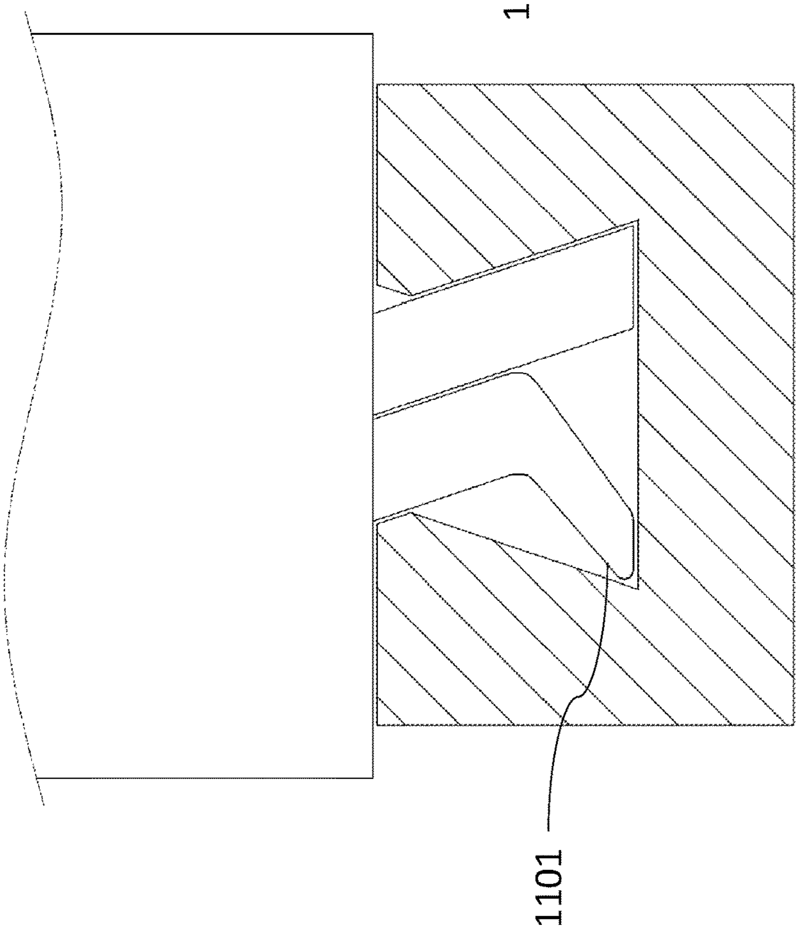
FIG. 17A is another schematic view illustrating an embodiment of the lock for securing a portable device.
Figure 17C:
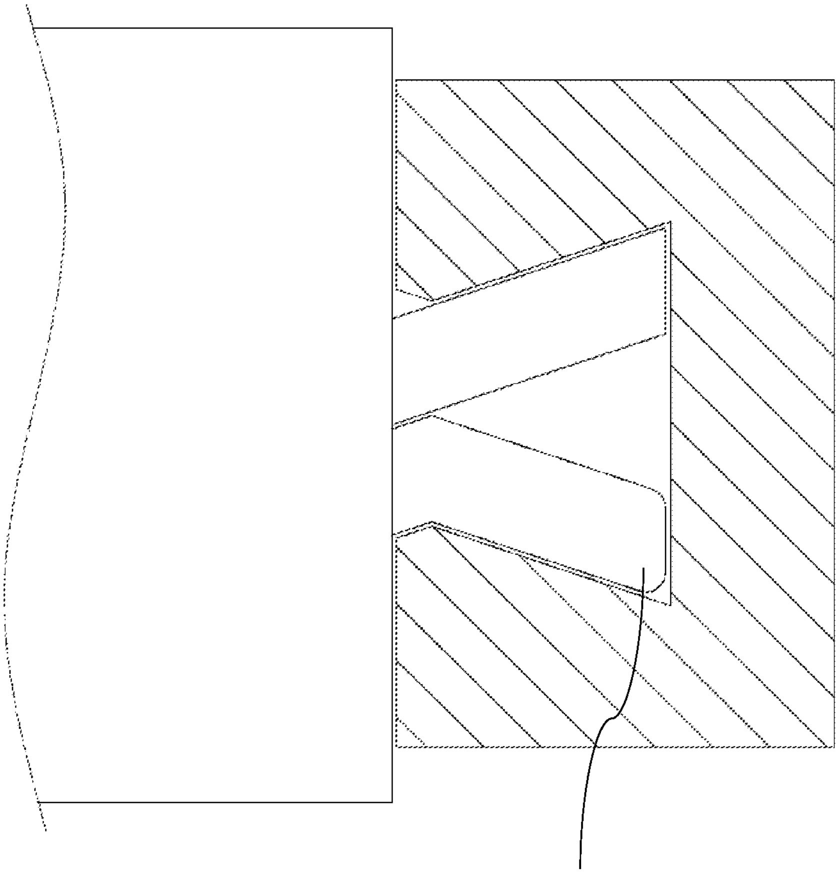
FIG. 17C is another schematic view illustrating an embodiment of the lock for securing a portable device.
Figure 18:
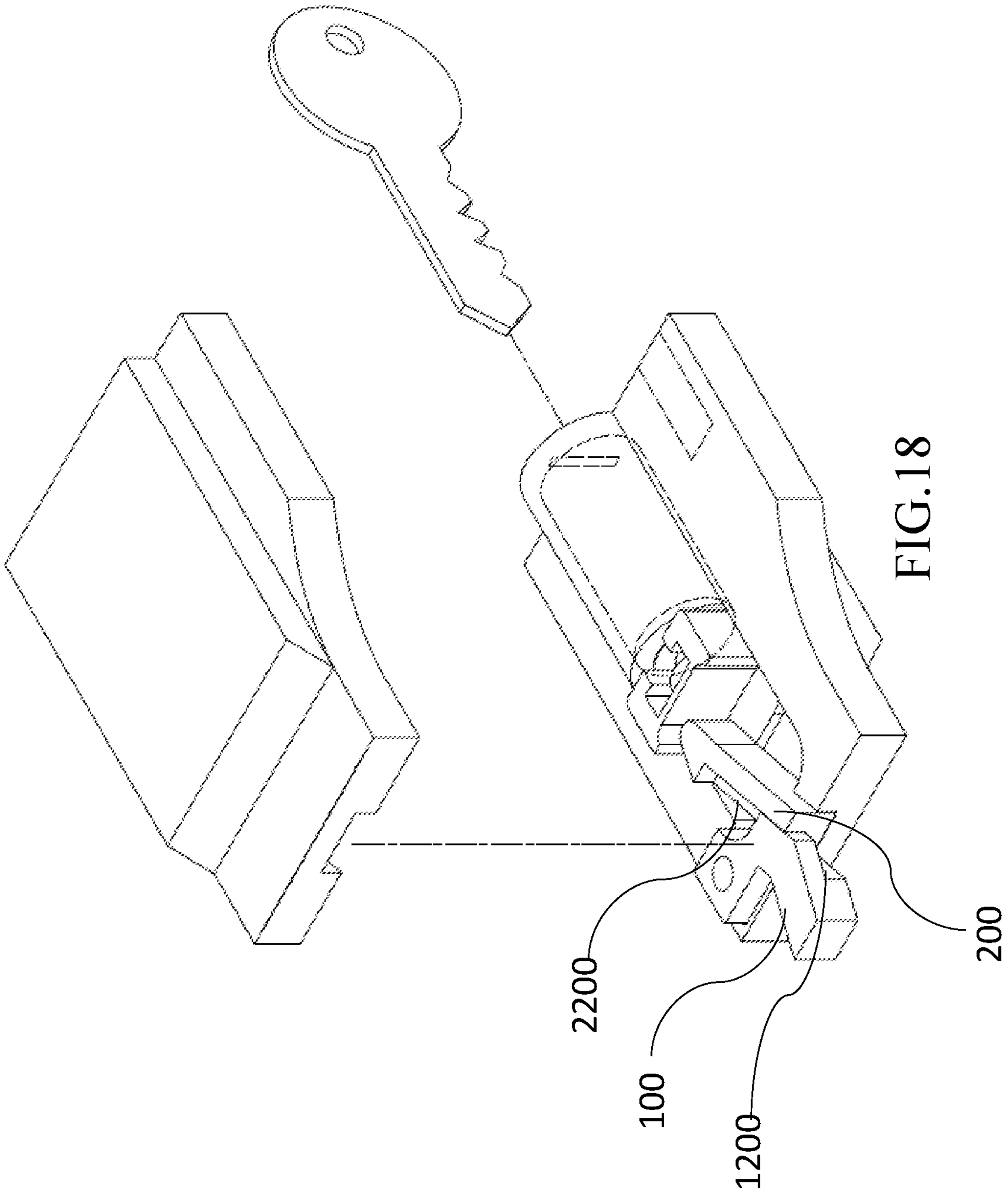
FIG. 18 is a schematic view illustrating an embodiment of the lock for securing a portable device having portion with reduced thickness.

With reference to FIGS. 17A, 17B, and 17C, in some embodiments, the front end 1101 of the front section 110 of the outside portion 102 of the first engaging member 100 consists rounded corners or curves. The angles between the front section and the rear section may also be rounded as shown in FIG. 17A. In other embodiments, the second engaging member 200 may consist rounded corners or curves as well. According to the present embodiment, the first engaging member or the second engaging member 200 may be easier to be inserted into the cavity 2. Furthermore, in some instances, the angle formed between the rear section and the front section of the first engaging member can be rounded and curved also.

Figure 19:
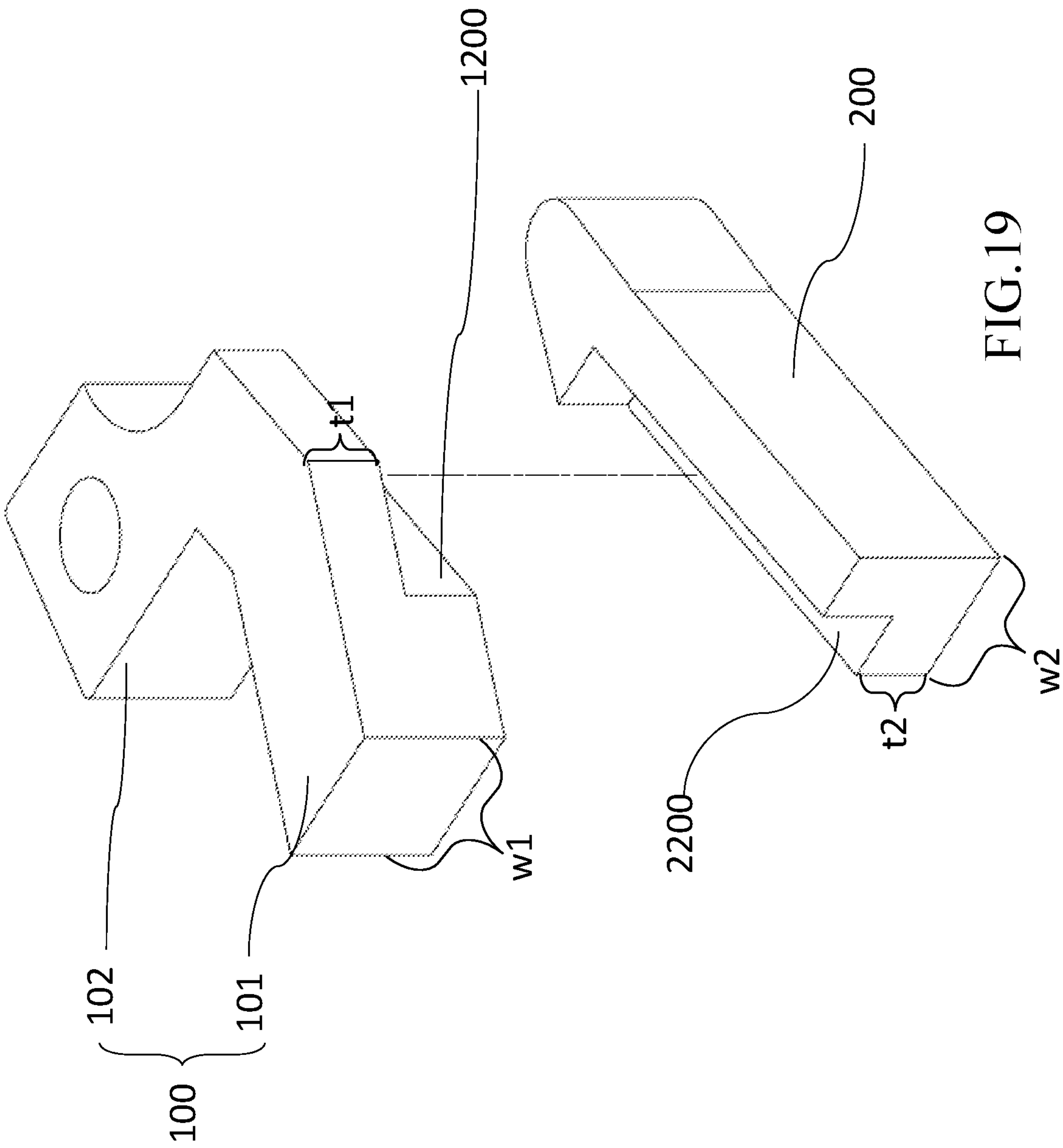
FIG. 19 is another schematic view illustrating the portion with reduced thickness.
Figure 20:
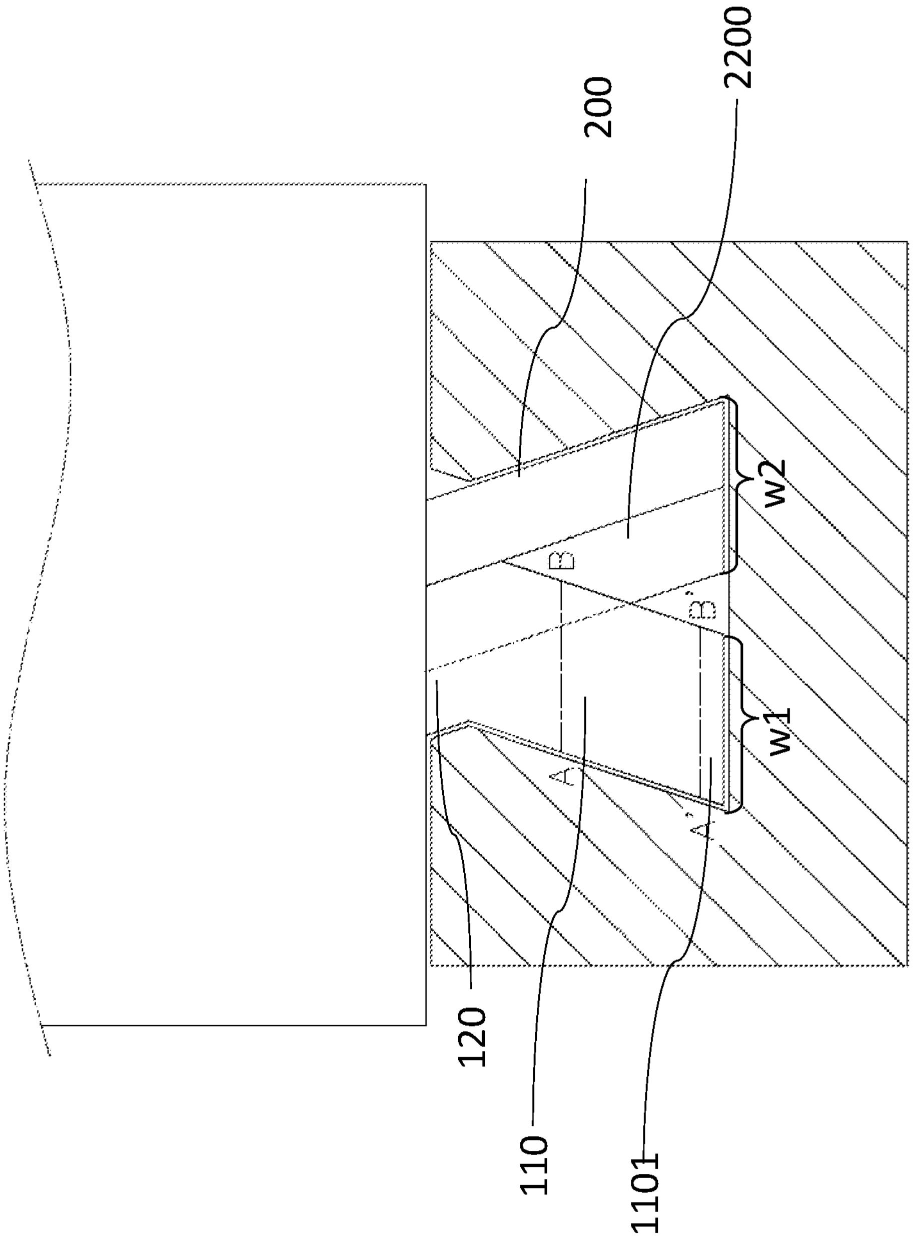
FIG. 20 is another schematic view illustrating an embodiment of the lock for securing a portable device having portion with reduced thickness.

With reference to FIGS. 18-22, in a variation of the present invention, the first engaging member 100 and the second engaging member 200 may respectively comprise a first portion with a first reduced thickness 1200 and a second portion with a reduced thickness 2200. The first portion with a first reduced thickness 1200 of the first engaging member 100 and the second portion with a reduced thickness 2200 of the second engaging member 200 may have a thickness t1 and t2 that is a fraction of the original thickness (e.g., approximately ⅔, ½, or ⅓ of the original thickness) of the first engaging member 100 and the second engaging member 200, so there is a lateral space in the thickness direction for a portion of the first engaging member 100 and the second engaging member 200 to overlap with each other, as shown in FIGS. 19 and 20. In this embodiment, the width w1 of the first engaging member 100 and the width w2 of the second engaging member 200 can be maximized to increase their strength. The shape of the first portion with a first reduced thickness 1200 and a second portion with a reduced thickness 2200 must be configured to facilitate the movement of the second engaging member 200 relative to the first engaging member 100. Particularly, the location and shape of the first portion with a first reduced thickness 1200 need to be configured for the area where the maximum width of the second engaging member 200 to pass through in order for the second engaging member 200 to extend from the lock body 10 and retract back into the lock body 10. Since the first portion with a first reduced thickness 1200 and the second portion with a reduced thickness 2200 overlap with each other, therefore, when the second engaging member 200 extends or retracts from the lock body 10, at least a portion of the second engaging member 200 moves across the first engaging member 100.

Figure 21:
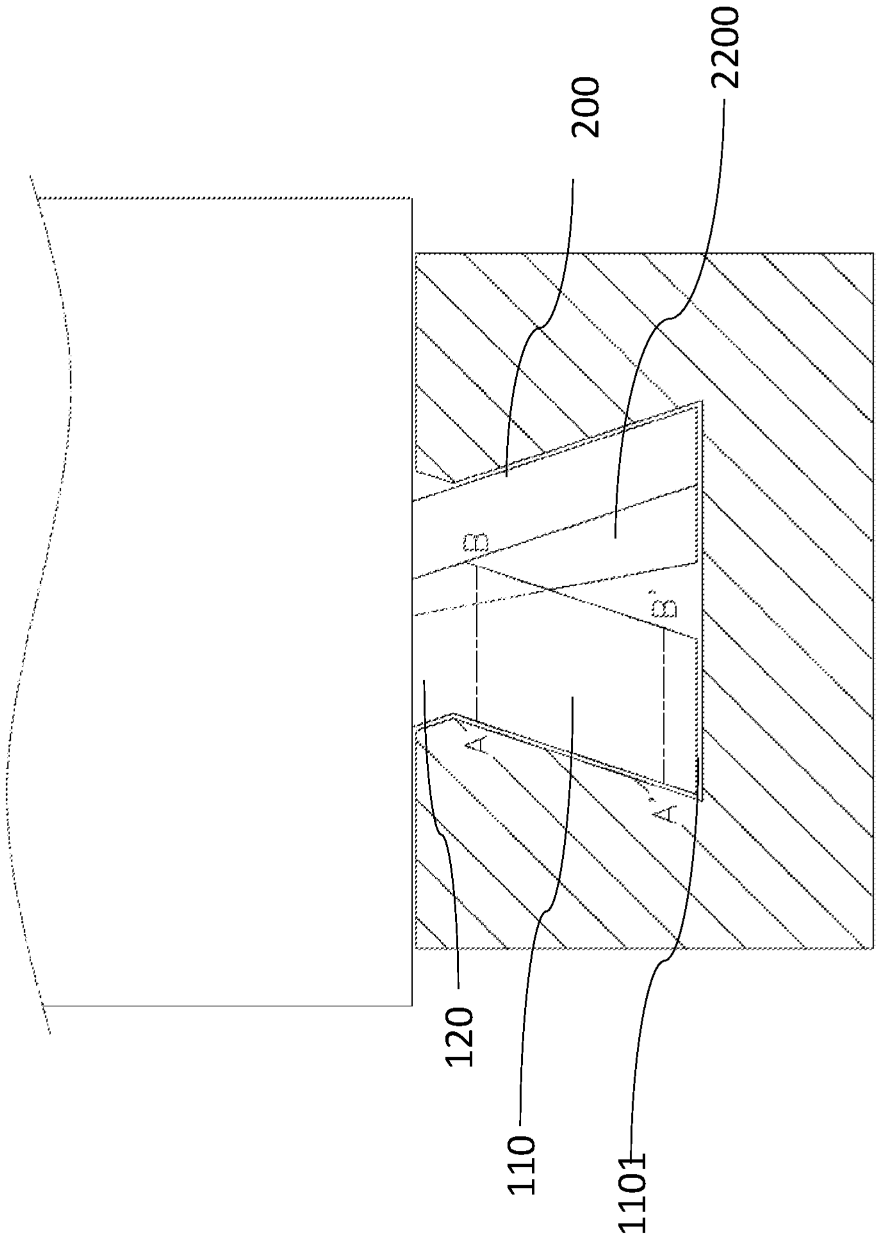
FIG. 21 is another schematic view illustrating an embodiment of the lock for securing a portable device having portion with reduced thickness.
Figure 22:
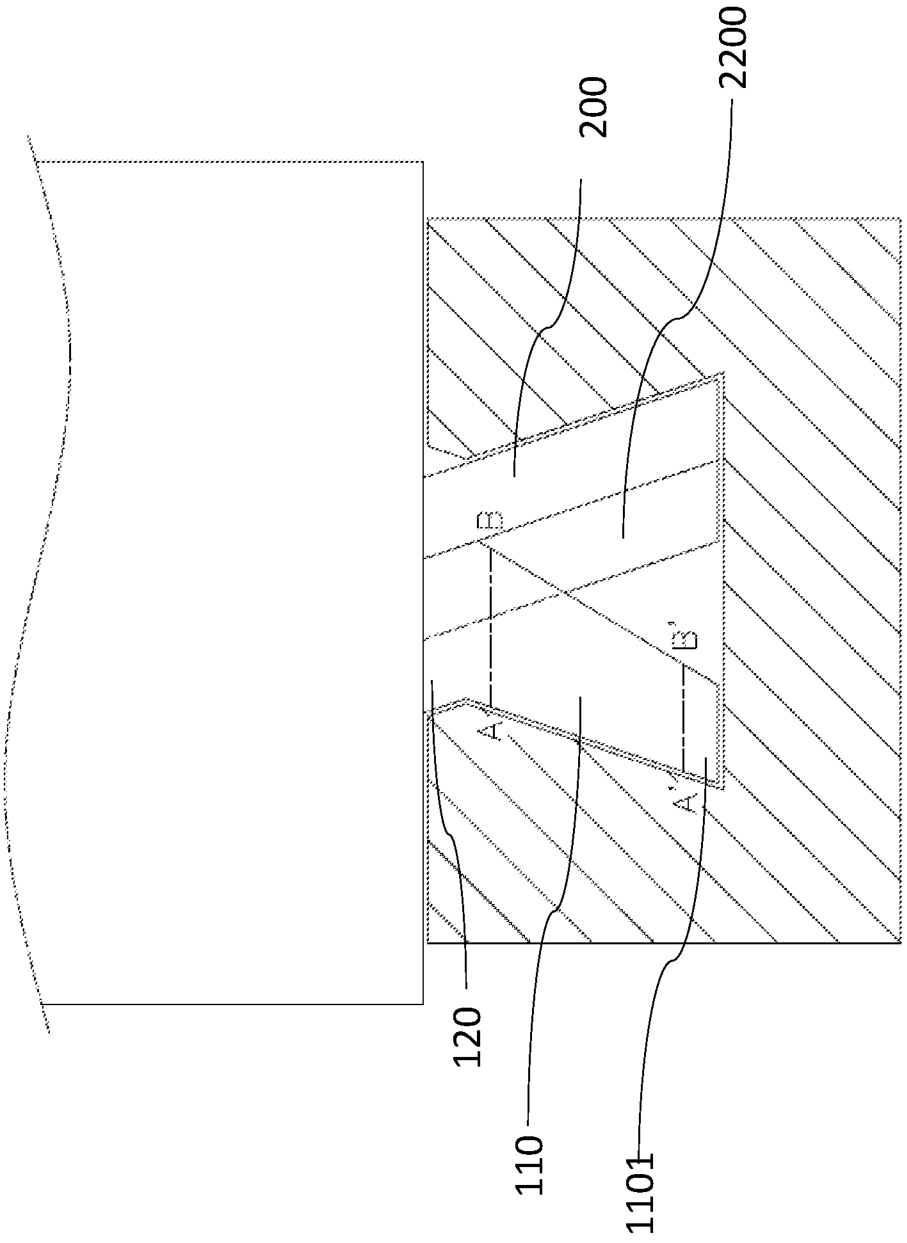
FIG. 22 is another schematic view illustrating an embodiment of the lock for securing a portable device having portion with reduced thickness.
Figure 23:
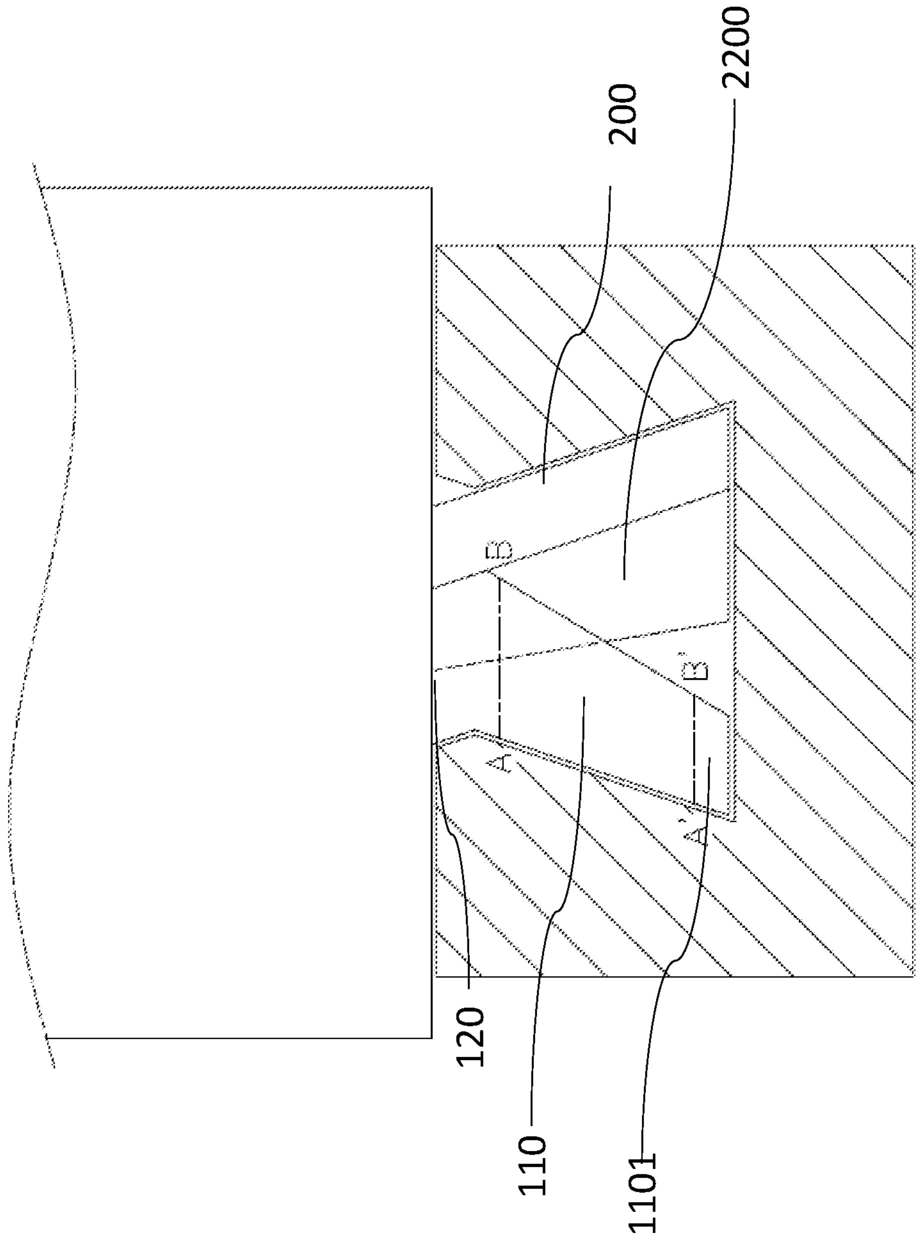
FIG. 23 is another schematic view illustrating an embodiment of the lock for securing a portable device having portion with reduced thickness.

With the implementation of the first portion with a first reduced thickness 1200 and a second portion with a reduced thickness 2200, the width w1 of the first engaging member 100 and the width w2 of the second engaging member 200 can be increased relative to the embodiments shown in FIGS. 5-12, leaving relatively smaller volume of unoccupied space of the cavity 2. Similar to the previous embodiments, in one of the embodiments shown in FIG. 20, the cross-sectional area of the front section 110 at A-B is substantially the same as the cross-sectional area at A'-B'. The cross-sectional area of the second engaging member 200 may also be constant. However, in other embodiments, the cross-sectional area of the second engaging member 200 can also gradually increased, as shown in FIGS. 21 and 23; whereas, the cross-sectional area of the front section 110 can become larger from the front end 1101 of the front section 110 towards the rear end 1102 of the front section 110 (as shown in FIGS. 22 and 23); or the first engaging member 100 may become larger from the front section 110 to the rear section 120. In these embodiments, the space of the cavity 2 is still not substantially filled by the first engaging member 100 and the second engaging member 200.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present invention covers modifications and variations that come within the scope of the appended claims and their equivalents.

What is claimed is:

1. A lock for securing a portable device with a cavity having a first sidewall and a second sidewall both of which extend away from an opening into the cavity with a gradually increasing distance between the two sidewalls for a section of the two sidewalls extending away from the opening, comprising:

a lock body;

a first engaging member projecting from the lock body and having an outside part outside the lock body, a cross-sectional area of the outside part of the first engaging member being substantially the same or become larger from a front end towards a rear end of the outside part of the first engaging member, and the outside part of the first engaging member being configured to be insertable into the cavity; and a second engaging member, connected to the lock body and configured to move along a side of or across the first engaging member to insert into the cavity for a locking status and to withdraw from the cavity for an unlocking status;

wherein the first engaging member and the second engaging member bear against the first sidewall and the second sidewall when the second engaging member is in the locking status.

2. The lock for securing a portable device of claim 1, wherein the outside part of the first engaging member comprises a front section and a rear section with a second predetermined angle relative to the front section.

3. The lock for securing a portable device of claim 2, wherein the front section comprises two branches extending from the rear section of the outside part of the first engaging member.

4. The lock for securing a portable device of claim 2, wherein the front end of the front section of the outside part of the first engaging member extends away from the second engaging member.

5. The lock for securing a portable device of claim 2, wherein the front end of the front section of the first engaging member extends toward the second engaging member.

6. The lock for securing a portable device of claim 1, wherein a side of the second engaging member partially in contact with a side of the first engaging member when in the locking status.

7. The lock for securing a portable device of claim 1, wherein when the second engaging member is inserted into the cavity, the second engaging member applies a pressure on the first engaging member to cause a portion of the first engaging member to abut against the first sidewall or the second sidewall for preventing the first engaging member to be withdrawn from the cavity when a force is applied to the first engaging member to direct the first engaging member away from the cavity.

8. The lock for securing a portable device of claim 1, wherein the distance between the two sidewalls becomes smaller in a first section and then becomes larger in a second section when both sidewalls extend away from an opening into the cavity.

9. The lock for securing a portable device of claim 8, wherein each of the first sidewall and the second sidewall in the second section has an angle larger than 90 degrees relative to a plane of the opening.

10. The lock for securing a portable device of claim 8, wherein the cavity in the second section has a substantially trapezoidal shaped cross-section.

11. The lock for securing a portable device of claim 1, wherein a sum of a maximum extension dimension of the first engaging member and the second engaging member inside the cavity in the locking status is larger than a minimum dimension of the cavity.

12. The lock for securing a portable device of claim 1, further comprising a lock cylinder provided in the lock body, wherein the lock cylinder further comprises a piston being able to move axially relative to the lock cylinder and protrude from the lock cylinder.

13. The lock for securing a portable device of claim 12, wherein the second engaging member is coupled to the piston via a moveable rack.

14. The lock for securing a portable device of claim 13, wherein the moveable rack further comprises a receiving member for coupling with an end of the piston, the moveable rack is adapted to move in an axial direction along with the piston to move the second engaging member to protrude from the lock body or retract partially or completely into the lock body.

15. The lock for securing a portable device of claim 1, wherein the first engaging member has an inside part inside the lock body, the lock body further comprises a pivotal shaft, and the inside part of the first engaging member is coupled to the lock body via the pivotal shaft.

16. The lock for securing a portable device of claim 12, wherein the lock cylinder further comprises a locking mechanism configured to operate between the locking status or the unlocking status.

17. The lock for securing a portable device of claim 16, wherein the locking mechanism further comprises a keyhole for inserting a key thereinto.

18. The lock for securing a portable device of claim 16, wherein the locking mechanism is operated by the key.

19. The lock for securing a portable device of claim 1, wherein the front end of the front section of the outside part of the first engaging member comprises rounded corners or curves.

20. The lock for securing a portable device of claim 1, wherein the lock body further comprises a cable holder for holding an end of a cable.

21. The lock for securing a portable device of claim 1, wherein the first engaging member having a first portion with a first reduced thickness is partially overlapped with the second engaging member having a second portion with a reduced thickness so that the second engaging member is able to move across the first engaging member.

22. The lock for securing a portable device of claim 1, wherein a triangular space between the first engaging member and the second engaging member in the cavity is not filled in the locking status.

23. The lock for securing a portable device of claim 1, wherein the cross-sectional area of the first engaging member is substantially the same or become larger from the front section towards the rear section of the first engaging member.

24. The lock for securing a portable device of claim 1, wherein when the second engaging member is in the locking status, the first engaging member and the second engaging member collectively do not substantially fill the cavity and partially contact with the sidewalls of the cavity.

25. The lock for securing a portable device of claim 1, wherein when the second engaging member is in the locking status, the first engaging member and the second engaging member collectively do not substantially fill the cavity and do not contact with the entire surface of all sidewalls of the cavity.

26. The lock for securing a portable device of claim 1, wherein when the second engaging member is in the locking status, the first engaging member and the second engaging member collectively partially fill the cavity.

27. The lock for securing a portable device of claim 1, wherein when the second engaging member is in the locking status, a space is remained in the cavity.

* * * * *